United States Patent
Kim et al.

(10) Patent No.: US 9,906,773 B2
(45) Date of Patent: Feb. 27, 2018

(54) MOBILE TERMINAL AND METHOD FOR CONTROLLING THE SAME

(71) Applicant: LG Electronics Inc., Seoul (KR)

(72) Inventors: Jonghwan Kim, Seoul (KR); Hyungjin Kim, Seoul (KR); Woochan Seo, Seoul (KR); Kyungjin Min, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 14/735,614

(22) Filed: Jun. 10, 2015

(65) Prior Publication Data

US 2016/0029007 A1 Jan. 28, 2016

(30) Foreign Application Priority Data

Jul. 23, 2014 (KR) .................. 10-2014-0093463

(51) Int. Cl.

| | |
|---|---|
| *G06T 7/55* | (2017.01) |
| *H04N 13/02* | (2006.01) |
| *G06F 3/0481* | (2013.01) |
| *G06F 3/0484* | (2013.01) |
| *G06F 3/0488* | (2013.01) |
| *G06T 15/10* | (2011.01) |

(Continued)

(52) U.S. Cl.
CPC ......... *H04N 13/0242* (2013.01); *G01B 11/24* (2013.01); *G06F 3/0488* (2013.01); *G06F 3/04815* (2013.01); *G06F 3/04845* (2013.01); *G06T 7/55* (2017.01); *G06T 15/10* (2013.01); *G06T 17/00* (2013.01); *H04N 5/23216* (2013.01); *H04N 5/23222* (2013.01); *H04N 5/23293* (2013.01); *G06T 2200/04* (2013.01); *G06T 2200/08* (2013.01)

(58) Field of Classification Search
CPC .. H04N 13/0242; H04N 5/23216; G06T 7/55; G06T 17/00
See application file for complete search history.

(56) References Cited

U.S. PATENT DOCUMENTS

| | | | |
|---|---|---|---|
| 8,890,864 B2 | 11/2014 | Seol et al. | |
| 2008/0158365 A1* | 7/2008 | Reuter | G06K 9/20 348/207.1 |

(Continued)

FOREIGN PATENT DOCUMENTS

| | | |
|---|---|---|
| KR | 10-2012-0113854 A | 10/2012 |
| KR | 10-2013-0066294 A | 6/2013 |

(Continued)

OTHER PUBLICATIONS

International Search Report for Application PCT/KR2015/006275 dated Oct. 13, 2015.

*Primary Examiner* — Nam Pham
(74) *Attorney, Agent, or Firm* — KED & Associates LLP

(57) ABSTRACT

The present disclosure relates to a mobile terminal capable of capturing an image through an array camera, and the mobile terminal may include a display unit, a camera arranged with a plurality of lenses along a plurality of lines to capture a plurality of images, and a controller configured to acquire a plurality of three-dimensional information on different faces of a subject using a plurality of image groups consisting of the plurality of images, and generate information on a stereoscopic shape associated with the subject using the plurality of three-dimensional information.

25 Claims, 25 Drawing Sheets

(51) Int. Cl.
*H04N 5/232* (2006.01)
*G06T 17/00* (2006.01)
*G01B 11/24* (2006.01)

(56) References Cited

U.S. PATENT DOCUMENTS

| | | |
|---|---|---|
| 2013/0215454 A1 | 8/2013 | Tan et al. |
| 2014/0016016 A1* | 1/2014 | Berestov ............ H04N 5/23212 348/345 |
| 2014/0022351 A1 | 1/2014 | Cho et al. |
| 2014/0028823 A1 | 1/2014 | Tahk et al. |
| 2014/0129990 A1* | 5/2014 | Xin ........................ G06F 3/017 715/849 |
| 2015/0091818 A1* | 4/2015 | Kim ................... H04N 13/0051 345/173 |
| 2016/0163098 A1* | 6/2016 | Blanchflower ......... G06T 15/50 345/419 |

FOREIGN PATENT DOCUMENTS

| | | |
|---|---|---|
| KR | 10-2014-0008210 A | 1/2014 |
| KR | 10-2014-0011215 A | 1/2014 |

\* cited by examiner

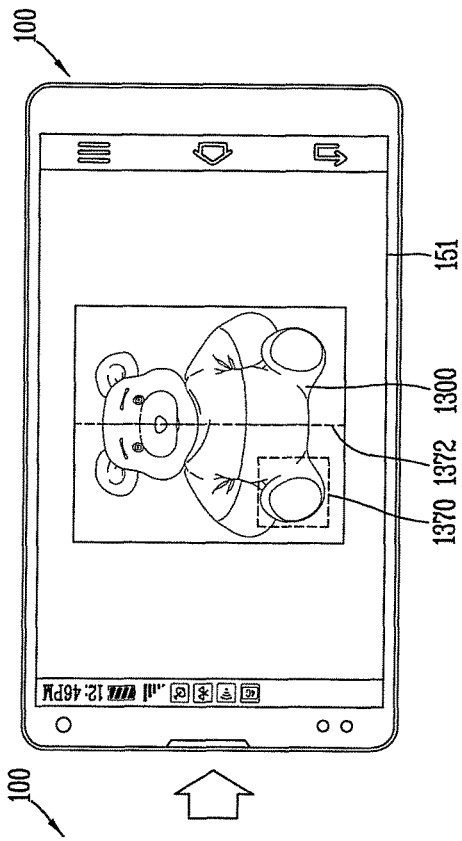
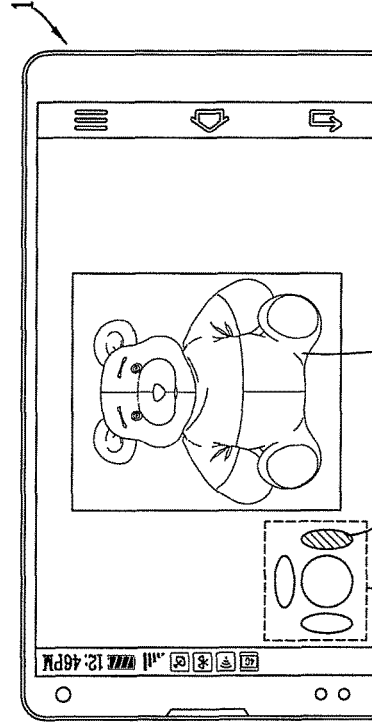
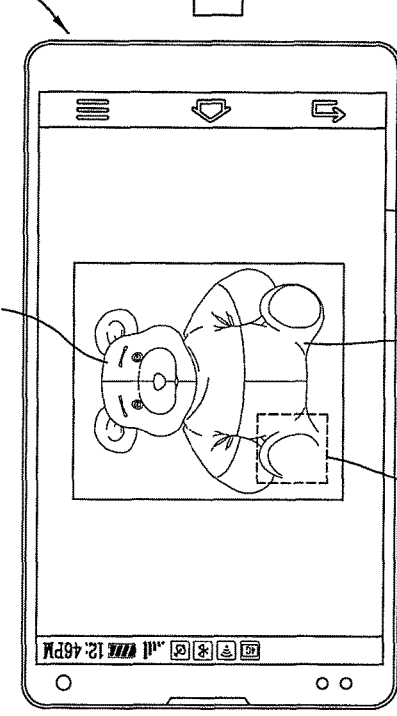

MOBILE TERMINAL AND METHOD FOR CONTROLLING THE SAME

CROSS-REFERENCE TO RELATED APPLICATION(S)

This application claims priority under 35 U.S.C. § 119 to Korean Application No. 10-2014-0093463 filed in Korea on Jul. 23, 2014, whose entire disclosure is hereby incorporated by reference.

BACKGROUND

1. Field

The present disclosure relates to a mobile terminal capable of capturing an image through an array camera.

2. Background

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Owing to such improvements, a mobile terminal may be provided with a camera including a plurality of lenses, and be able to capture a plurality of images having different distances to subjects at the same time through the plurality of lenses.

Furthermore, studies on various methods for using such a plurality of images having different focal distances have been actively carried out.

The above references are incorporated by reference herein where appropriate for appropriate teachings of additional or alternative details, features and/or technical background.

SUMMARY OF THE INVENTION

An aspect of the present disclosure relates to a mobile terminal capable of acquiring information on a stereoscopic shape associated with a subject, and a control method thereof.

Another aspect of the present disclosure is to provide a mobile capable of displaying a 3D (three dimension) image associated with the subject using information on a stereoscopic shape associated with the subject or outputting a stereoscopic shape associated with the subject through a 3D printer, and a control method thereof.

In order to accomplish the foregoing or other objectives, according to an aspect of the present disclosure, a mobile terminal according to the present disclosure may include a display unit, a camera arranged with a plurality of lenses along a plurality of lines to capture a plurality of images, and a controller configured to acquire a plurality of three-dimensional information on different faces of a subject using a plurality of image groups consisting of the plurality of images, and generate information on a stereoscopic shape associated with the subject using the plurality of three-dimensional information.

According to an embodiment, when there is an available 3D printer, the controller may connect the mobile terminal to the 3D printer to transmit information on the stereoscopic shape to the 3D printer, and control the 3D printer to output a stereoscopic shape associated with the subject.

According to an embodiment, the controller may analyze the flexion of one face of the subject from images captured of one face of the subject, and determine a scheme of capturing the plurality of images based on the analysis result.

According to an embodiment, the controller may divide one face of the subject into a plurality of regions according to the extent of flexion of one face of the subject as a result of the analysis, and vary the scheme of capturing the plurality of images for each of the divided regions.

According to an embodiment, the controller may allow a user to select the scheme of capturing the plurality of images for each of the divided regions in advance.

According to an embodiment, the controller may control such that at least part of the plurality of lenses captures a high resolution image for a region having a level higher than a preset value of the extent of flexion among the plurality of regions, and another portion of the plurality of lenses records a video for a region having a level lower than a preset value of the extent of flexion among the plurality of regions.

According to an embodiment, the controller may display regions having a different extent of flexion in a distinguished manner from one another based on the analysis result.

According to an embodiment, when there are a plurality of subjects, the controller may group the plurality of lenses into a plurality of groups according to the number of subjects, and generate a plurality of three-dimensional information on a different subject for each group, and generate information on a stereoscopic shape associated with each of the subjects using the three-dimensional information for each group.

According to an embodiment, the controller may display a preview image for the subject on the display unit using a plurality of images received from the camera, and further display guide information on the display unit based on at least one of a distance between the subject and the camera and a location of the subject displayed on the preview image.

According to an embodiment, when a first distance between the subject and the camera recognized from a previously captured subject image and a second distance between the subject and the camera recognized from the preview image are different from each other by more than a predetermined amount, the controller may display the guide information, and the guide information may include information indicating a difference between the first distance and the second distance.

According to an embodiment, when a first location of the subject displayed on a previously captured subject image and a second location of the subject displayed on the preview image are different from each other by more than a predetermined amount, the controller may display the guide information, and the guide information may include information on a direction for aligning the second location with a location corresponding to the first location.

According to an embodiment, when three-dimensional information on a specific face of the subject is insufficient in generating information on a stereoscopic shape of the subject, the controller may display notification information for displaying the specific face on the display unit.

According to an embodiment, the controller may generate three-dimensional information on the specific face using three-dimensional information on another face of the subject symmetric to the specific face.

According to an embodiment, the controller may display an image containing a 3D object corresponding to the subject on the display unit based on a user's touch input applied to the display unit using the stereoscopic shape.

According to an embodiment, the controller may partition the display unit into a plurality of regions, and display image information associated with a different face of the subject in each of the plurality of regions, and display an image associated with a specific face of the 3D object displayed in the selected region on at least part of the display unit when any one of the plurality of regions is selected.

According to an embodiment, the controller may select image information displayed on at least part of the plurality of regions according to a preset order to sequentially display them on at least part of the display unit, and the preset order may be an order in which at least part of the plurality of regions is selected by a user.

According to an embodiment, the controller may display an image in which the 3D object is rotated around at least one preset axis based on a user's touch drag trajectory sensed in one region of the display unit.

In order to accomplish the foregoing or other objectives, according to an aspect of the present disclosure, a mobile terminal according to the present disclosure may include a display unit, a camera configured to capture an image for a specific subject, and a controller configured to display an image containing a 3D object corresponding to the subject on the display unit using a plurality of three-dimensional information generated from a different face of the subject, wherein the controller displays an image displayed with a specific face of the 3D object on the display unit based on at least one of a size of a region in which a user's touch input is sensed, and a direction in which the sensed location of the region is changed.

According to an embodiment, the controller may rotate the 3D object around at least one preset axis based on a size change of a region in which a touch input is sensed and a direction in which the sensed location of the region is changed.

In order to accomplish the foregoing or other objectives, according to an aspect of the present disclosure, there is provided a control method of a mobile terminal including a camera arranged with a plurality of lenses along a plurality of lines to capture a plurality of images, and the method may include acquiring 3D information on one face of a subject from a plurality of image groups captured of one face of the subject, acquiring a plurality of 3D information on different faces of the subject, generating information on a stereoscopic shape associated with the subject using the plurality of 3D information, and controlling a preset peripheral device to display a stereoscopic shape corresponding to the subject using information on the stereoscopic shape.

BRIEF DESCRIPTION OF THE DRAWINGS

The embodiments will be described in detail with reference to the following drawings in which like reference numerals refer to like elements wherein:

FIGS. 13B(a), 13B(b), 13B(c) and 13B(d) are exemplary views illustrating an example of displaying guide information for indicating a specific face of a subject requiring the acquisition of 3D information in such a mobile terminal according to an embodiment of the present disclosure;

DETAILED DESCRIPTION

Figure 1A:
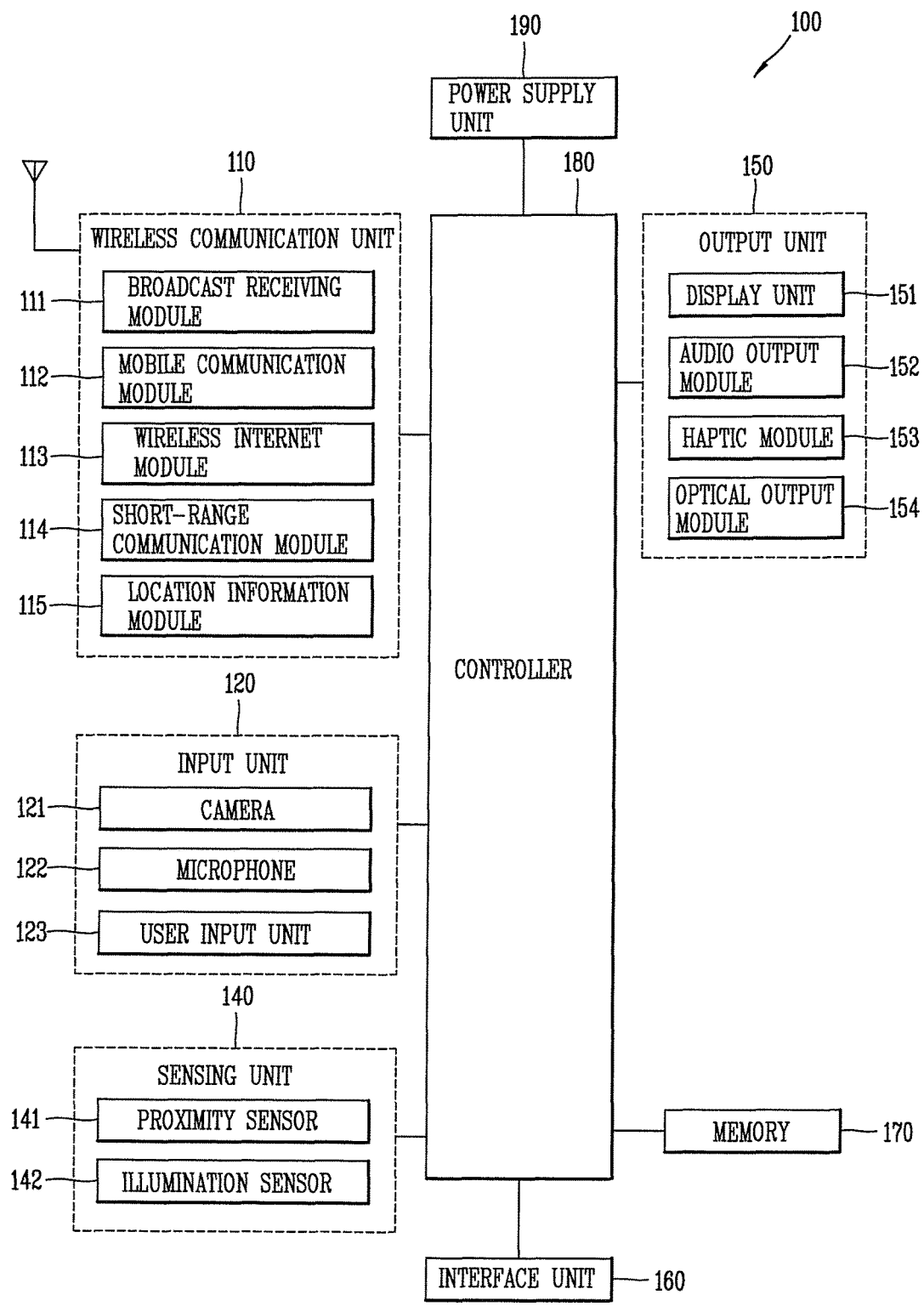
FIG. 1A is a block diagram for explaining mobile terminal associated with present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes in addition to the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it will be obvious to those skilled in the art that the present invention may be also applicable to a fixed terminal such as a digital TV, a desktop computer and a digital signage, except for specific configurations for mobility.

Figure 1B:
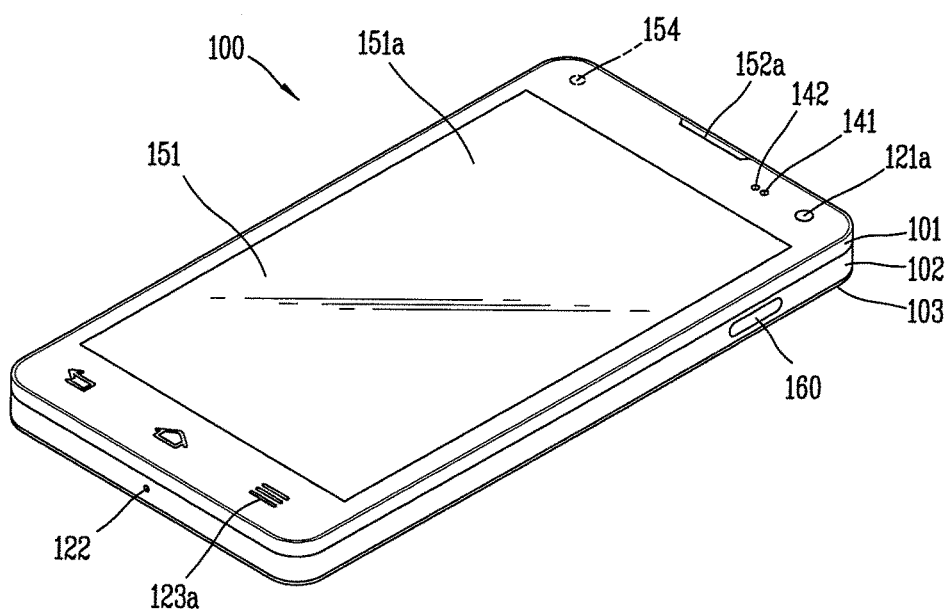
FIGS. 1B, 1C and 1D are conceptual views illustrating an example in which a mobile terminal associated with the present disclosure is seen from different directions.
Figure 1C:
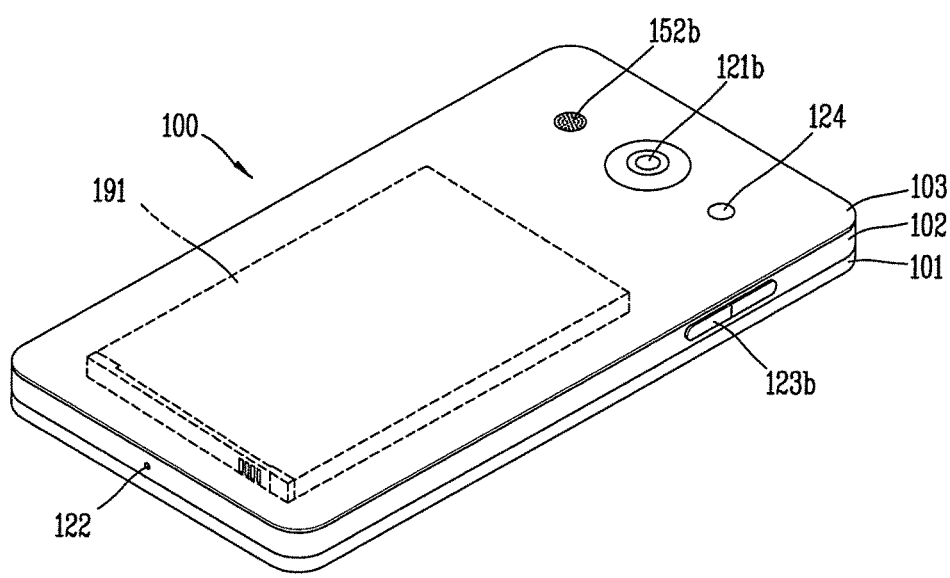

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific portion of the display unit 151, or convert capacitance occurring at a specific portion of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152*b* may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver, and the second audio output module 152*b* may be implemented in the form of a loud speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may be implemented in a user's non-tactile manner, e.g., by a proximity touch, a hovering touch, etc.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (refer to FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
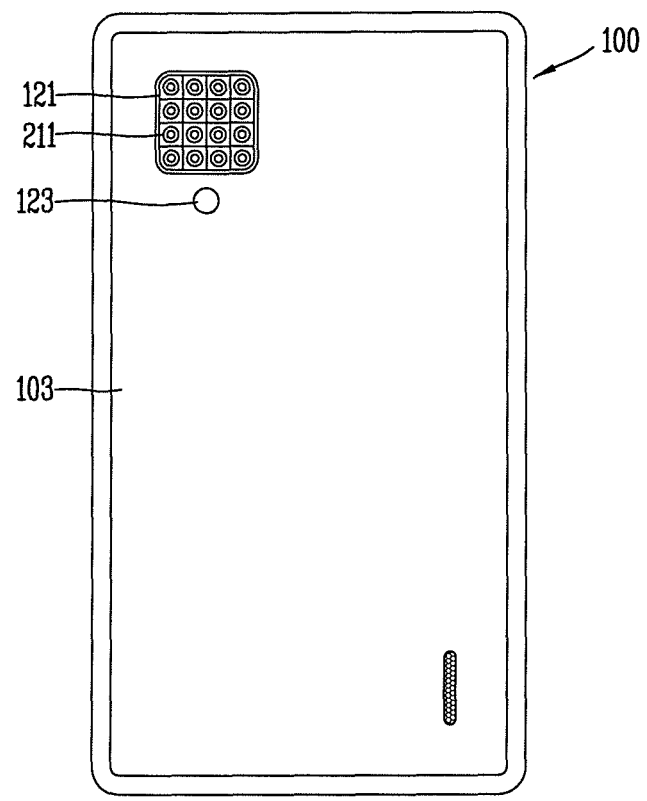

Furthermore, a mobile terminal 100 according to an embodiment of the present disclosure, including at least one of the foregoing constituent elements, may include a camera arranged with a plurality of lenses along a plurality of lines as illustrated in FIG. 1D. In this manner, a plurality of lenses may be arranged in a matrix form in such an array camera arranged with a plurality of lenses.

The array camera may be formed with several small-sized camera modules having lenses, respectively, as illustrated in FIG. 1D, and the camera modules may have different focal distances (depth information), respectively. Accordingly, the array camera may capture a plurality of images having a plurality of focal distances from one shot. As a result, the array camera can generate a 3D image using a parallax generation effect generated due to differences between the focal distances to as well as obtain a high resolution image by combining images captured from the camera modules. Furthermore, the array camera may have a different aperture value set to each of the camera modules, thus allowing a different amount of light to be transmitted through a lens provided in each of the camera modules.

On the other hand, as described above, the array camera may extract the depth information of an image received using a plurality of images having different focal distances being captured at the same time. For example, the array camera may store distance information to a subject for each image captured through the lenses, respectively, thus containing the distance information to the subject for each pixel constituting the combined image. In this case, the controller 180 may acquire solid information, namely, 3D information, on one face of a subject for which an image has been captured.

On the other hand, upon receiving images captured from different faces of the subject, the controller 180 of the mobile terminal 100 according to an embodiment of the present disclosure may acquire a plurality of 3D information on different faces of the subject from each of the images. Furthermore, the controller 180 may generate information on a stereoscopic shape associated with the subject using each 3D information on different faces of the subject. In addition, the generated information on a stereoscopic shape may be transmitted to another peripheral device connected thereto. For example, the controller 180 may transmit information on such a stereoscopic shape to a preset 3D printer.

Figure 2:
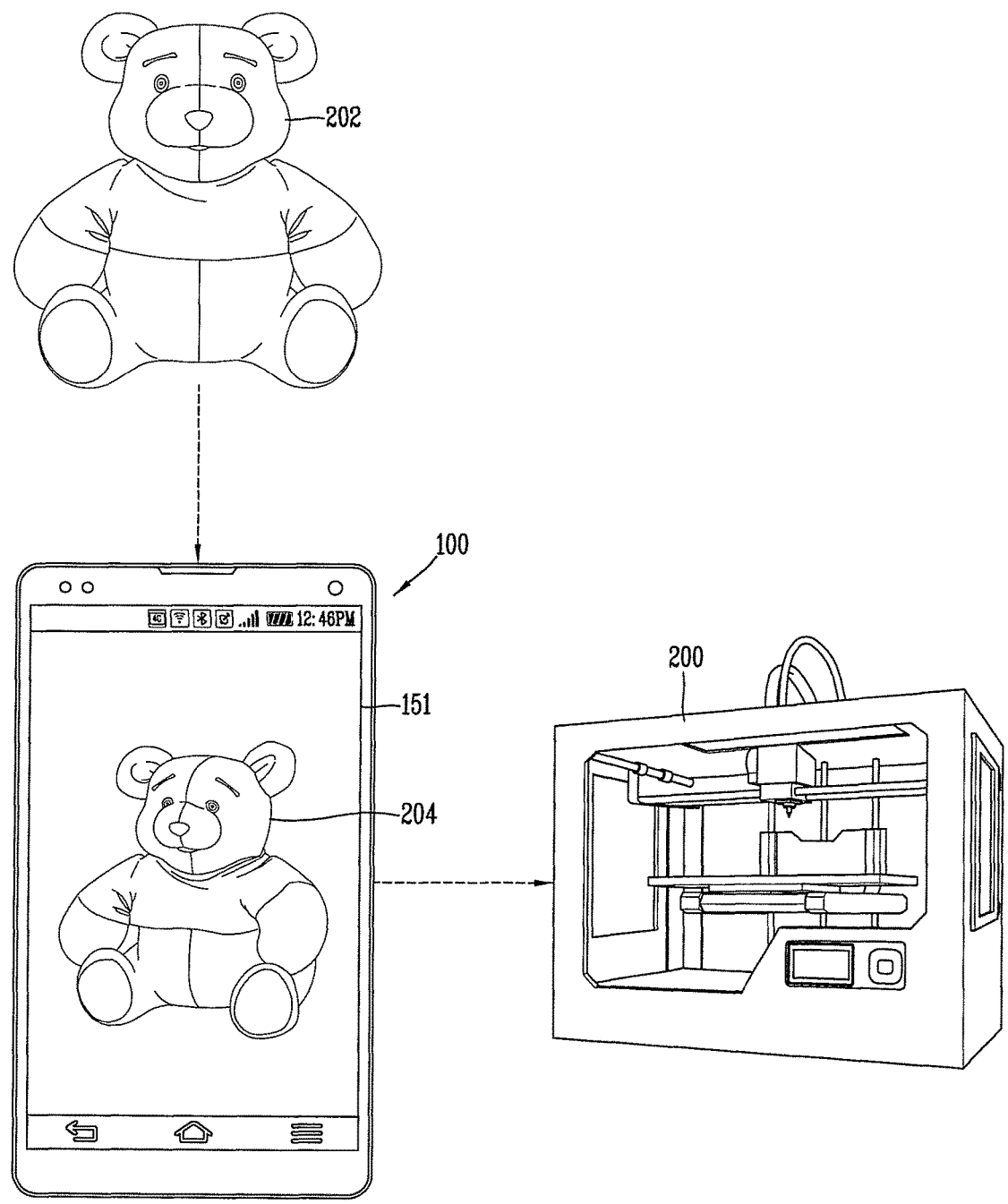
FIG. 2 is a conceptual view illustrating an example in which a mobile terminal associated with the present disclosure is connected to a preset 3D printer.

FIG. 2 is a conceptual view illustrating an example in which such a mobile terminal associated with the present disclosure is connected to a preset 3D printer.

Referring to FIG. 2, the controller 180 of the mobile terminal 100 according to an embodiment of the present disclosure may generate information on a stereoscopic shape associated with the subject using images captured from different faces of the subject 202. The generated information on a stereoscopic shape of the subject may be information on a stereoscopic shape on all the faces of the subject. In other words, information on a stereoscopic shape of the entire faces of 360 degrees including a rear surface and both left and right faces as well as a front surface of the subject may be generated.

In this case, the controller 180 may transmit the generated information on a stereoscopic shape of the subject to the 3D printer 200 as illustrated in FIG. 2. Furthermore, the controller 180 may control the 3D printer 200 to output a stereoscopic shape corresponding to the subject 202. Accordingly, it may be possible to generate a stereoscopic shape corresponding to the subject 202 through the 3D printer 200.

On the other hand, the controller 180 may generate the 3D shape 204 corresponding to the subject using information on the stereoscopic shape 204 associated with the subject 202. In this case, the controller 180 may display the generated 3D object on the display unit 151 of the mobile terminal 100. The controller 180 may display an image of various faces of the subject 202 on the display unit 151 according to a user's selection for the generated 3D object 204.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

Figure 3:
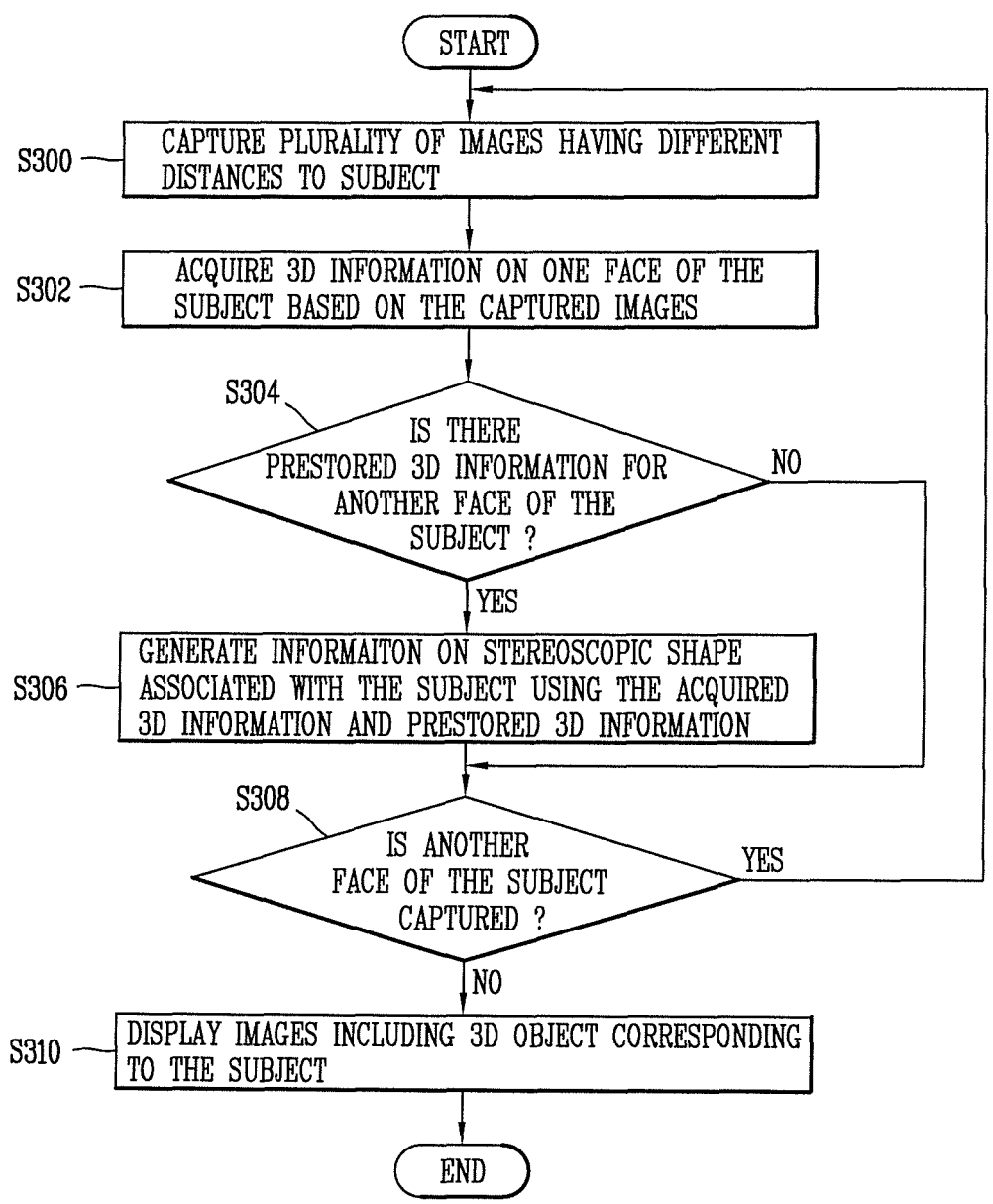
FIG. 3 is a flow chart illustrating an operation process of generating information on a stereoscopic shape associated with a subject in a mobile terminal according to an embodiment of the present disclosure.

FIG. 3 is a flow chart illustrating an operation process of generating information on a stereoscopic shape associated with a subject in a mobile terminal according to an embodiment of the present disclosure.

Referring to FIG. 3, the controller 180 of the mobile terminal 100 according to an embodiment of the present disclosure stores an image captured of a subject (S300). In this case, the camera 121 may capture and store a plurality of different images having different distances with respect to one face of the subject using a plurality of lenses provided therein at the same time.

Upon receiving a plurality of images with different distances between a plurality of lenses, respectively, and the subject, namely, focal distances with respect to one face, the controller 180 may generate a high resolution image for one face of the subject based on the captured images, and store the depth value of each pixel constituting the generated high resolution image. In this case, the controller 180 may acquire solid information (3D information) on the shape or appearance of one face of the subject, the flexion of one face of the subject and the like from the depth value of each pixel (S302).

On the other hand, upon acquiring such 3D information on a specific face of the subject, the controller 180 may check whether or not there is prestored 3D information on another face of the subject (S304). Furthermore, when there is another prestored 3D information on the another face of the subject as a result of checking in the step S304, the controller 180 may generate information on a stereoscopic shape associated with the subject using 3D information acquired in the step S302 and 3D information on the another prestored face (S306).

For example, the controller 180 may generate information associated with a stereoscopic shape on a plurality of faces of the subject using 3D information acquired in the step S302 and the prestored 3D information of another face of the subject. In other words, the controller 180 may combine 3D information captured from another face of the subject based on the prestored 3D information on a specific face of the subject to generate information associated with a stereoscopic shape on still another face of the subject.

On the other hand, when stereoscopic shape information including 3D information on a plurality of faces of the subject as described above is generated, the controller 180 may determine whether or not another face of the subject has been captured (S308). Furthermore, when still another face of the subject has been captured as a result of the determination in the step S308, the controller 180 may repeat the processes from the step S300 to the step S306. In this case, the controller 180 may generate information including a stereoscopic shape for still another face of the subject using 3D information acquired from an image of still another face of the subject.

On the other hand, when still another face of the subject is not captured as a result of the determination in the step S308, the controller 180 may generate 3D object corresponding to the subject using information on a stereoscopic shape that has been generated until now. In this case, the controller 180 may display the generated 3D object on the display unit 151 or transmit information on a stereoscopic shape of the subject to the 3D printer 200 according to a user's selection (S310). Furthermore, when information on a stereoscopic shape of the subject is transmitted to the 3D printer 200, the controller 180 may control the 3D printer 200 to output a stereoscopic shape corresponding to the subject formed of a preset material.

On the other hand, in the step S310, the 3D object may be generated based on information on a stereoscopic shape of the subject that has been generated until now. In other words, when information on a stereoscopic shape of the subject is generated for the entire surfaces of the subject, the controller 180 may generate a 3D object corresponding to the entire stereoscopic shape of the subject. However, if information on a stereoscopic shape of the subject is generated for a specific face (for example, either one of a front surface and a rear surface) of the subject, the controller 180 may generate a 3D object corresponding to a specific face (for example, either one of a front surface and a rear surface) of the subject.

On the other hand, such a 3D object corresponding to the subject may be determined according to information on a stereoscopic shape of the subject that has been generated until now. Accordingly, a specific face of the subject for which stereoscopic shape information has not been generated or a portion of the specific face may be displayed on the 3D object to be distinguished from the other portions of the subject. In this case, the user may check a stereoscopic shape of the subject that has been generated until now and a specific face of the subject for which the stereoscopic shape information has not been generated or a portion thereof.

On the other hand, the controller 180 of the mobile terminal 100 according to an embodiment of the present disclosure may vary a scheme of capturing an image of the subject according to the flexion of a subject shape while acquiring 3D information on one face of the subject. For example, when the flexion of a subject shape is very low, the controller 180 may capture an image of the subject in a recording scheme for recording a low resolution image or an image being received, thereby reducing a size of image captured of the subject and further reducing a processing time.

On the other hand, the controller 180 may analyze the extent of the flexion for each portion of the subject as well as the flexion of the entire shape of the subject, thereby varying the scheme of capturing an image for each portion of the subject. For example, a plurality of lenses may capture different portions of the subject, respectively, and in this case, the controller 180 may determine the scheme of capturing an image through a lens of capturing an image of the corresponding portion based on the extent of the flexion of the shape of each portion of the subject.

Figure 4:
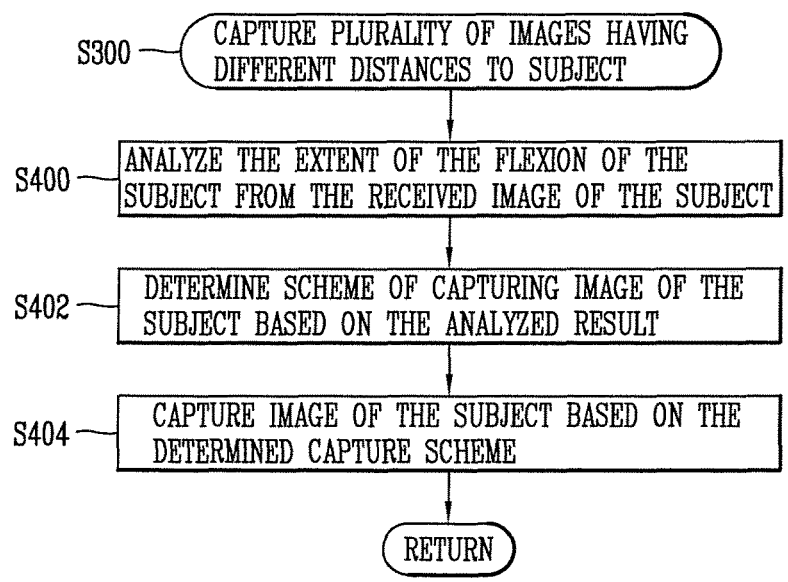
FIG. 4 is a flow chart illustrating an operation process of analyzing the flexion of a subject shape and determining a capture scheme according to the analyzed result during the process of FIG. 3.

FIG. 4 specifically illustrates an operation process of allowing a mobile terminal according to an embodiment of the present disclosure to analyze the flexion of a subject shape and determine a capture scheme according to the analyzed result during the process of FIG. 3.

Referring to FIG. 4, upon receiving an image of the subject is received from a plurality of lenses, the controller 180 of the mobile terminal 100 according to an embodiment of the present disclosure generates a high resolution image associated with the subject using the received images. Furthermore, the controller 180 analyzes the shape of the subject and the flexion of the subject shape from the generated image (S400).

For example, in the step S400, the controller 180 may display a high resolution image received from the camera 121 in a preview state on the display unit 151, and analyze the shape of the subject, the number and shape of the flexions of the subject shape, and the like through the image in a preview state. For example, the controller 180 may extract depth information of the subject shape from the preview image of the subject, and recognize the flexion of the subject shape using the extracted depth information. Furthermore, when the recognized extent of the flexion is above a preset level, the controller 180 may display a portion in which the flexion is recognized from the shape of the subject, and request the recapturing of the portion to the user.

On the other hand, the controller 180 may determine the scheme of capturing an image of the subject according to whether or not the flexion is above a preset level based on the extent of the flexion of the subject shape (S402). For example, the controller 180 may determine whether or not to capture the subject with a low resolution image or high resolution image based on the number of the recognized flexions and the complexity of the recognized flexion. For example, when the number of recognized flexions is high, and the flexion has a narrow and winding shape as a result of analyzing the flexion of the subject shape, the controller 180 may determine a high resolution image capture scheme. On the contrary, when the number of recognized flexions is low, and the flexion has a simple linear shape, the controller 180 may determine a low resolution image capture scheme. Furthermore, when the scheme of capturing the subject is determined in the step S402, the controller 180 may capture a subject based on the determined capture scheme (S404).

On the other hand, according to the foregoing description, it has been described that the controller 180 of the mobile terminal 100 according to an embodiment of the present disclosure can vary the scheme of capturing an image associated with each portion of the subject according to the shape of each portion of the subject. In this case, the controller 180 may capture each portion of the subject using a different capture scheme based on a result of analyzing the extent of the flexion from the shape of the subject in the step S400.

For example, the controller 180 may analyze the flexion of the subject shape from a preview shape received from one face of the subject, and divide the one face of the subject into a plurality of regions based on the analysis result of the flexion. In this case, the controller 180 may capture the plurality of divided regions of the subject using different schemes based on the analysis result of the flexion, namely, the number of the recognized flexions and complexity of the flexion.

In other words, in case of a region having a level higher than a preset value of the extent of flexion among the plurality of divided regions of the subject (for example, the number of the recognized flexions is above a preset number and/or the complexity determined based on the shape of the flexion is above a preset level), the controller 180 may determine that a high resolution image is required to acquire 3D information of the relevant region. In this case, the controller 180 may determine a capture scheme through lenses of capturing a region of the subject having a level higher than a preset value of the extent of flexion as the scheme of capturing a high resolution image.

On the contrary, in case of a region having a level lower than a preset value of the extent of flexion, the controller 180 may determine a capture scheme through lenses of capturing a region having a level lower than a preset value of the extent of flexion as the scheme of capturing a low resolution image.

Otherwise, the controller 180 may use a recording scheme for recording images being received in the form of video instead of capturing the low resolution image.

On the other hand, in the above description, a method of varying the scheme of capturing each portion of the subject based on the extent of the flexion of the subject has been described, and the capture scheme may be selected in advance by the user.

For example, the controller 180 may display a result of analyzing the flexion of the subject shape from a preview image received from one face of the subject and dividing the one face of the subject into a plurality of regions based on the analyzed result on the display unit 151. In this case, the controller 180 may display each portion of the subject displayed on the display unit 151 to vary according to the extent of the analyzed flexion. For example, the controller 180 may display a portion of the subject having a level lower than a preset value of the extent of flexion and a portion having a level higher than a preset value of the extent of flexion with different colors or display a separate graphic object for displaying it around each of the divided regions.

In this case, the controller 180 may further display a separate graphic object for allowing the user to select the capture scheme around each of the divided regions of the subject. Furthermore, the controller 180 may capture an image such that a specific region of the subject is captured according to the user's selected scheme based on the user's selection to the graphic object. Accordingly, the subject may be captured with a different capture scheme for each portion according to the extent of the recognized flexion. On the other hand, an example of selecting such a different capture scheme for each portion in the mobile terminal 100 according to an embodiment of the present disclosure will be described in more detail with reference to the following 9A to 9D.

On the other hand, the present disclosure may be of course applicable to a plurality of subjects as well as one subject. For example, in case of a plurality of subjects, the controller 180 of the mobile terminal 100 according to an embodiment of the present disclosure may acquire 3D information on one face for the subjects, respectively, for which 3D information will be acquired from the user. Furthermore, when 3D information on a different face of the subjects, respectively, are acquired, the controller 180 may generate information on a stereoscopic shape for the subjects, respectively, using the 3D information acquired for each subject.

Figure 5:
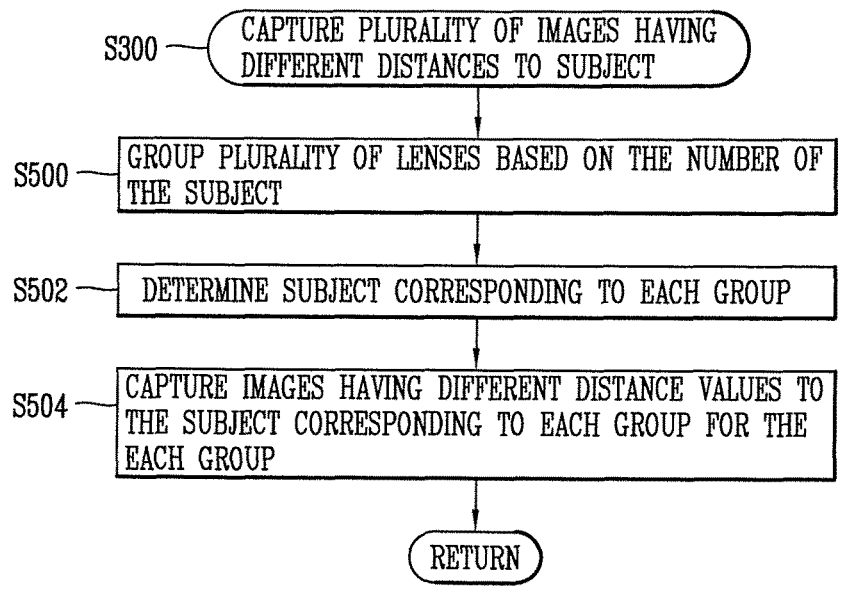
FIG. 5 is a flow chart illustrating an operation process of capturing an image for a plurality of subjects, respectively, when there are a plurality of subjects during the process of FIG. 3.

FIG. 5 illustrates an operation process of allowing a mobile terminal according to an embodiment of the present disclosure to capture an image for a plurality of subjects, respectively, when there are a plurality of subjects.

Referring to FIG. 5, when image capture for a plurality of subjects is selected by the user, the controller 180 of the mobile terminal 100 according to an embodiment of the present disclosure may group lenses provided in the camera 121 into a plurality of groups based on the number of subjects (S500). Here, the controller 180 may group part of the plurality of lenses to correspond to a location of the subjects based on the locations of the subjects.

On the other hand, when a plurality of lenses are grouped according to the recognized number of subjects, the controller 180 determines a subject corresponding to each group (S502). In other words, the controller 180 determines a group of lenses through which an image of recognized subjects is to be captured in the step S502. Furthermore, when a subject corresponding to each group is determined, the controller 180 captures different images having different distance values to the subject corresponding to each group for each group using a plurality of lenses contained in each group (S504). Accordingly, according to the present disclosure, when there are a plurality of subjects, the controller 180 may capture images having different focal distances from a plurality of lenses corresponding to each subject, and acquire 3D information on a specific face of the subjects, respectively, based on depth information obtained using the captured images. In this manner, an example in which a plurality of lenses are grouped according to the number of subjects to capture an image when there are a plurality of subjects will be described in more detail with reference to the following FIG. 10.

On the other hand, the mobile terminal 100 according to an embodiment of the present disclosure may generate information on a stereoscopic shape of the subject using images captured of at least one subject from different faces thereof as described above. In this case, the controller 180 may determine whether or not the subject is correctly captured based on a distance between the subject and the camera 121 from an image received from the camera 121 and a location of the subject being displayed within an image in which the subject is captured, and display information containing the result for the user. Furthermore, the information may be displayed in the form of guide for guiding a user to correctly capture an image of the subject for the user.

Figure 6:
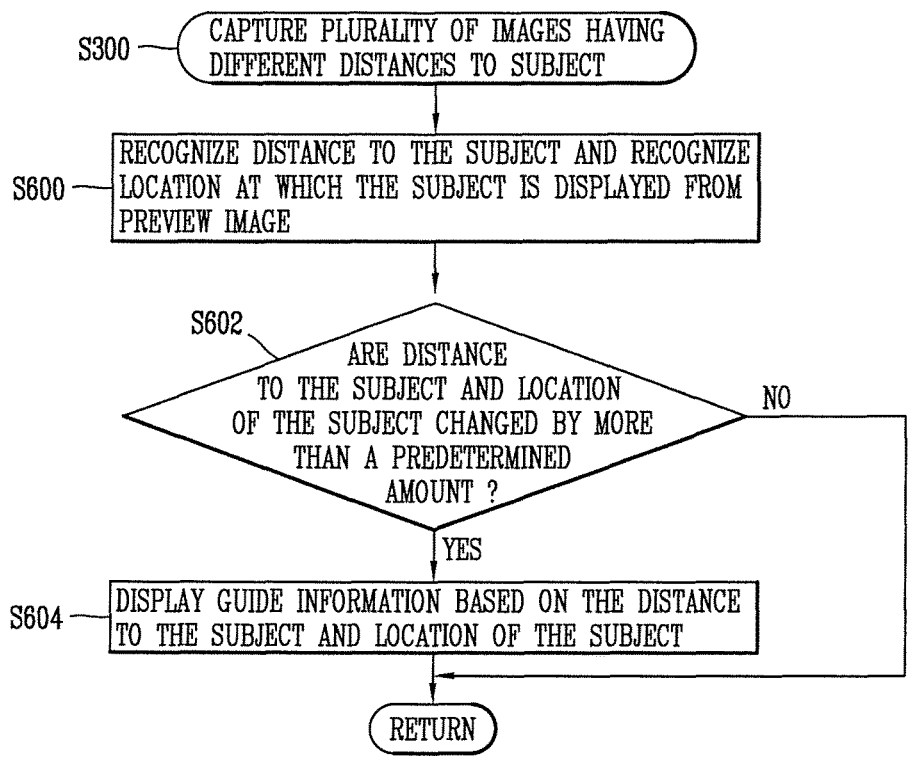
FIG. 6 is a flow chart illustrating an operation process of displaying guide information based on a distance to a subject and a location at which the subject is displayed during the process of FIG. 3.

FIG. 6 illustrates an operation process of displaying guide information based on a distance to a subject and a location at which the subject is displayed in such a mobile terminal according to an embodiment of the present disclosure.

Referring to FIG. 6, when an image for the subject is received at the camera 121, the controller 180 of the mobile terminal 100 according to an embodiment of the present disclosure recognizes a distance to the subject and/or recognize a location at which the subject is displayed on a preview image for the subject (S600). In this case, the controller 180 determines whether or not the recognized distance to the subject and/or location at which the subject is displayed in the step S600 are/is changed by more than a predetermined amount compared to the recognized distance and/or location at which the subject is displayed from a previously captured image of the subject (S602). Furthermore, when the distance between the subject and the camera 121 and/or location at which the subject is displayed are/is changed by more than a predetermined amount as a result of the determination in the step S602, the controller 180 may display guide information for notifying it to the user (S604).

On the other hand, the guide information may further include information for guiding the user to correctly capture an image for the subject in addition to information for notifying that a distance between the subject and the camera and/or a location at which the subject is displayed are/is changed. For example, the guide information may include information for approaching more closely to each other since a distance between the camera 121 and the subject is currently too far away from each other, and otherwise, on the contrary, information for further securing a distance between the subject and the camera 121. Otherwise, when a location at which the subject is displayed on an image is wrong, the guide information may further include information for guiding the user to correctly adjust the location at which the subject is displayed. The examples of the guide information will be described in more detail with reference to the following FIGS. 12A and 12B.

On the other hand, according to the foregoing description, the guide information may display information on a specific face of the subject and a portion of the subject required to generate information on a stereoscopic shape of the subject. For example, when there is a specific face of the subject and a portion of the subject or the like for which 3D information is not sufficiently obtained in generating information on a stereoscopic shape of the subject, the controller 180 may display information for notifying it to the user.

Figure 7:
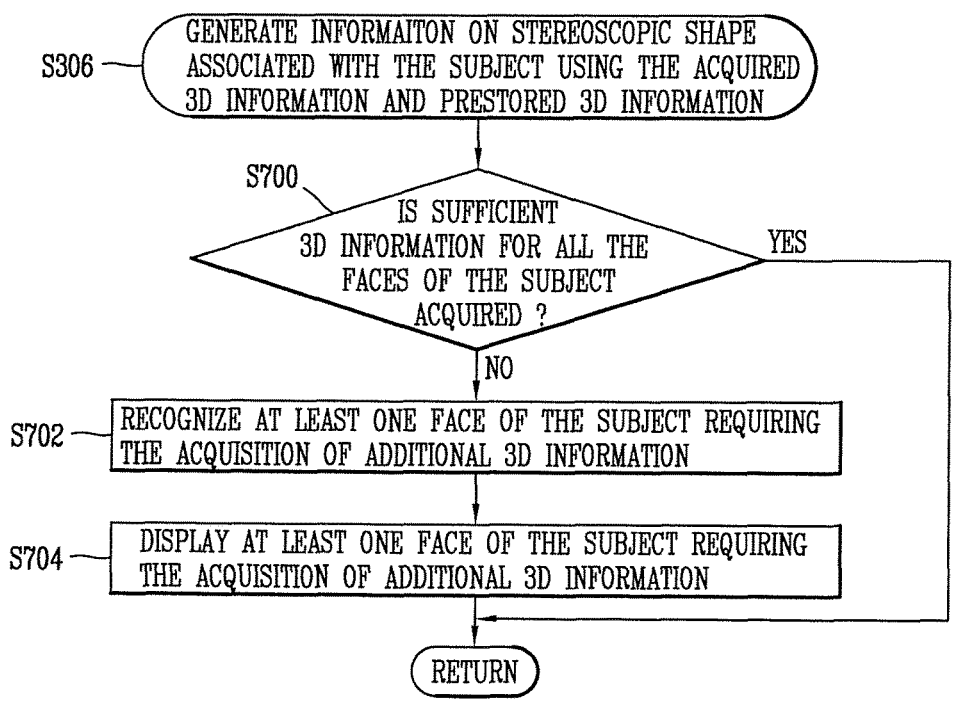
FIG. 7 is a flow chart illustrating an operation process of displaying guide information for notifying of a face of a subject requiring the acquisition of 3D information during the process of FIG. 3.

FIG. 7 illustrates an operation process of displaying guide information for notifying a specific face or a specific portion of the subject requiring the acquisition of 3D information to the user in a mobile terminal according to an embodiment of the present disclosure.

Referring to FIG. 7, when information on a stereoscopic shape for the subject is generated in the step S306, the controller 180 of the mobile terminal 100 according to an embodiment of the present disclosure checks whether or not sufficient 3D information on all the faces of the subject are acquired (S700). Furthermore, when all the faces of the subject are sufficiently acquired as a result of the checking in the step S700, the controller 180 may control a 3D printer connected thereto to output a stereoscopic shape corresponding to the subject using the generated information.

On the other hand, when all the faces of the subject are not sufficiently acquired as a result of the checking in the step S700, the controller 180 may recognize at least one face of the subject requiring the acquisition of additional 3D information (S702). For example, the controller 180 may use a 3D object generated using information on a stereoscopic shape of the subject in the step S702.

The 3D object may be generated using information on a stereoscopic shape corresponding to the subject. Accordingly, a specific face of the subject with insufficient information or a portion corresponding to the subject may be displayed in an incomplete state, for example, a vacant state or the like.

In this case, the controller 180 may display at least one face or a specific portion of the subject requiring the acquisition of additional 3D information on the display unit 151. For example, the controller 180 may display part of the 3D object in an incomplete state on the display unit 151 to display at least one face of the subject requiring the acquisition of additional 3D information for the user or display guide information containing a separate graphic object directly displaying a specific face on the display unit 151 to allow the user to recognize a specific portion of the subject requiring the acquisition of the additional 3D information. An example of guide information containing information on a specific portion or a portion of the subject requiring the acquisition of the additional 3D information as described above will be described in more detail with reference to the following FIGS. 13A and 13B.

On the other hand, when a 3D object corresponding to the subject is generated, the controller 180 of the mobile terminal 100 according to an embodiment of the present disclosure may display the generated 3D object on the display unit 151. In this case, the controller 180 may use the 3D object in various shapes to display an image associated with a stereoscopic shape of the subject.

For example, the controller 180 of the mobile terminal 100 according to an embodiment of the present disclosure may display images in which the subject is seen from a plurality of faces using the 3D object. In this case, images for different faces of the subject may be displayed on the display unit 151, and the controller 180 may display any one of the images in an enlarged manner on the display unit 151 according to the user's selection.

Figure 8A:
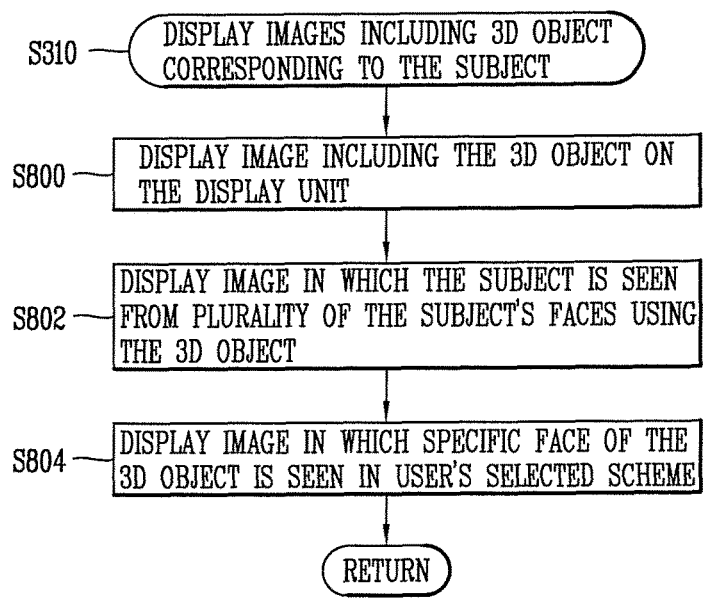
FIGS. 8A and 8B are flow charts illustrating an operation process of displaying an image containing a 3D object according to a user's selection during the process of FIG. 3.

FIG. 8A illustrates an example of an operation process of displaying an image containing a 3D object corresponding to the subject in a mobile terminal according to an embodiment of the present disclosure in this case.

Referring to FIG. 8A, when a 3D object corresponding to the subject is generated, the controller 180 of the mobile terminal 100 according to an embodiment of the present disclosure may display an image containing the generated 3D object on the display unit 151 (S800). In this case, the controller 180 may partition at least one region of the display unit 151 into a plurality of regions, and display different images in which the 3D object is seen from a specific face for each region (S802).

In this case, the controller 180 may allow the user to select any one of a plurality of images displayed on the display unit 151. In this case, an image selected by the user may be displayed in a further enlarged manner on the display unit 151, and displayed in a user's selected manner (S804). For example, the controller 180 may display at least part of the plurality of images selected by the user in a preset order on the display unit 151, and here, the preset order may be an order in which at least part of the images displayed on the display unit 151 is selected by the user.

On the other hand, the step S804 may be a process of displaying a state in which the 3D object is rotated in a specific direction based on a user's touch input applied to the display unit 151 or the like. For example, the controller 180 may rotate the 3D object based on a user's touch-and-drag input applied to one region of the display unit 151, and accordingly, the user may allow an image for viewing the 3D object in his or her desired direction to be displayed on the display unit 151.

On the other hand, the controller 180 of the mobile terminal 100 according to an embodiment of the present disclosure may of course display an image in which the 3D object is rotated on the display unit 151 using a different scheme in addition to the user's touch-and-drag input. For example, the mobile terminal 100 according to an embodiment of the present disclosure may display an image for a specific face of the 3D object on the display unit 151 based on a direction in which an area is changed around the area to which a user's touch input is applied and a size of the area.

Figure 8B:
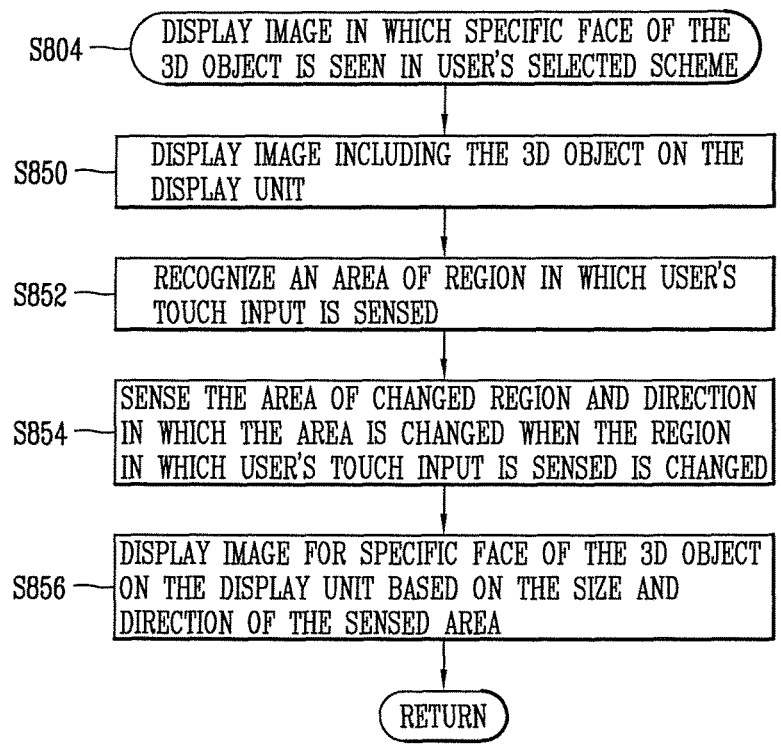

FIG. 8B illustrates a flow of the operation of a mobile terminal according to an embodiment of the present disclosure in this case.

When an image containing a 3D object is displayed on the display unit 151 (S850), the controller 180 of the mobile terminal 100 according to an embodiment of the present disclosure may recognize an area of a region in which the user's touch input is sensed (S852). For example, when the touch input is initially sensed, the controller 180 may set an area of the initially sensed region to a reference region. Furthermore, when a change of a region in which the touch input is sensed occurs, the controller 180 may change a state in which the 3D object is displayed such as rotating the 3D object displayed on the display unit 151 based on the change.

On the other hand, upon recognizing the touch input in the step S852, the controller 180 may sense whether or not an area in which the touch input is sensed has been changed. Furthermore, when an area in which the touch input is sensed has been changed, the controller 180 may recognize the resultant changed touch input region.

Figure 16A:
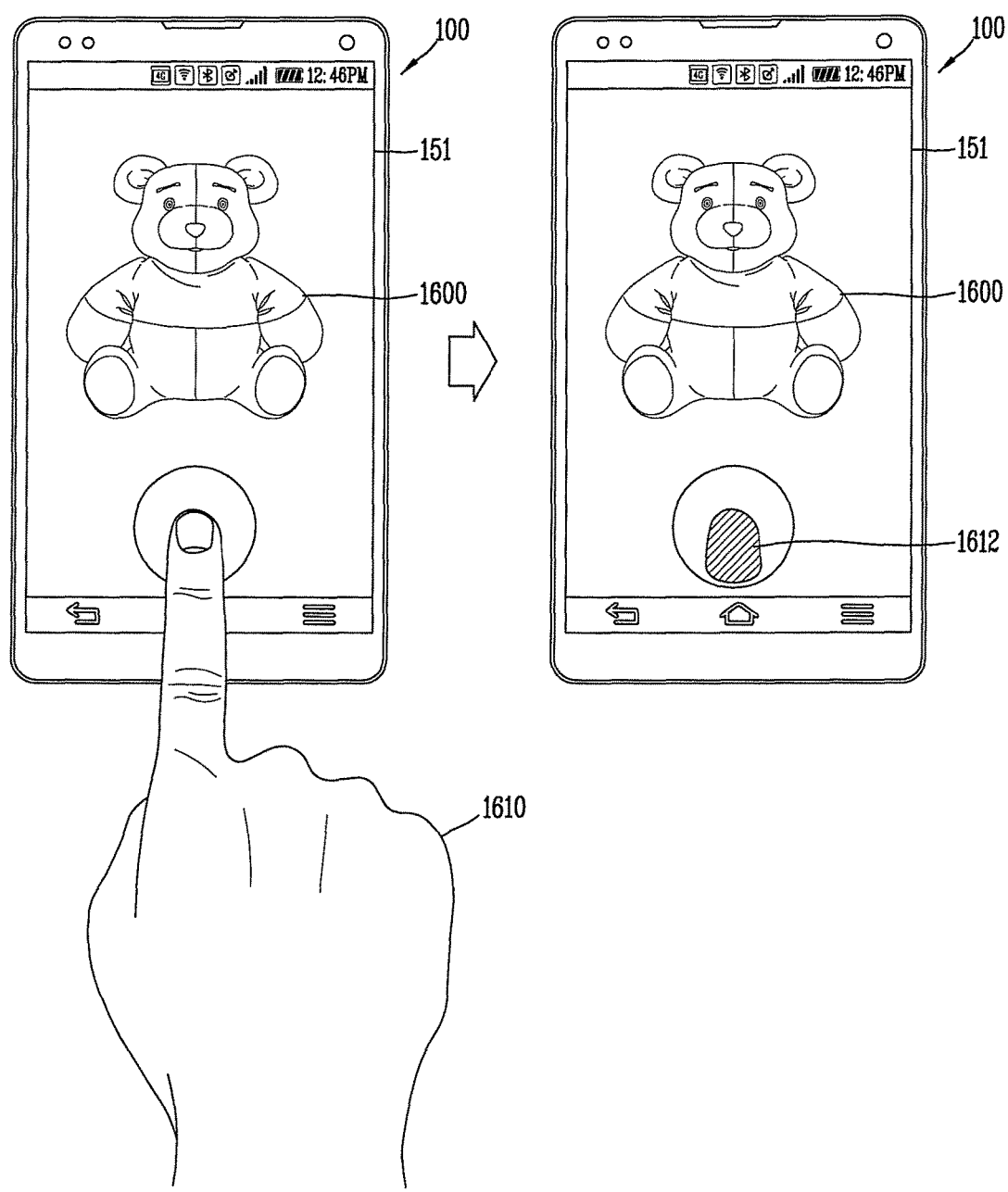
FIGS. 16A, 16B, 16C and 16D are exemplary views illustrating an example of displaying a 3D object corresponding to a subject based on a user's touch input in a mobile terminal according to an embodiment of the present disclosure.

In this case, the controller 180 may compare the changed touch input region with the initially recognized touch input region in the step S852 to sense an area of a region to which a user's touch input is applied and/or a direction in which the region is changed (S854). Then, the controller 180 may change a state of displaying the 3D object based on the size and/or direction of an area sensed in the step S854. For example, the controller 180 may rotate the 3D object around at least preset axis based on the size and/or direction of the sensed area, and display an image for a specific face of the 3D object on the display unit 151 as a result of the rotation (S856). Hereinafter, an example of determining a state in which a 3D object corresponding to the subject is displayed based on an area of a region to which the user's touch input is applied and/or a direction in which the area is changed as described above will be described in more detail with reference to the following FIGS. 16A and 16B.

On the other hand, in the foregoing description, an operation process of generating information on a stereoscopic shape for a specific subject using images captured of the specific subject from a plurality of different faces in a mobile terminal according to an embodiment of the present disclosure has be described in detail.

In the following description, the operation of a mobile terminal according to an embodiment of the present disclosure will be described in more detail with reference to the drawings illustrating an embodiment associated with the foregoing operations.

First, FIG. 9A to 9D illustrate examples of selecting a different capture scheme based on the flexion of a subject shape in a mobile terminal according to an embodiment of the present disclosure.

Figure 9A:
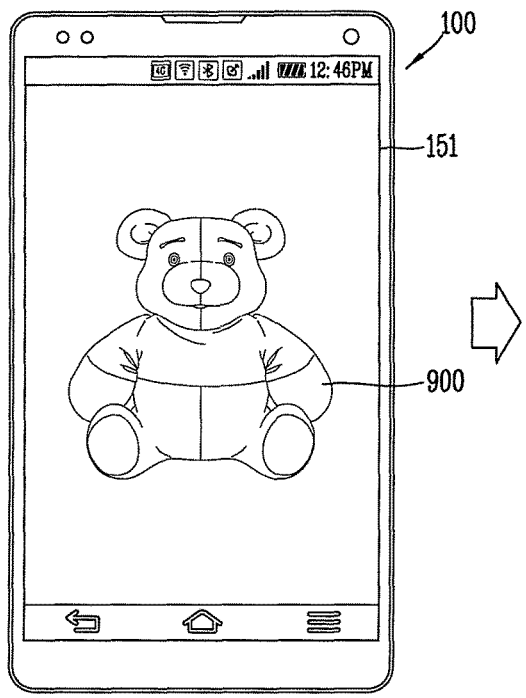
FIG. 9A to 9D is an exemplary view illustrating example of selecting a different capture scheme based on the flexion of a subject shape in a mobile terminal according to an embodiment of the present disclosure.

Referring to FIG. 9A, FIG. 9A illustrates an example in which a preview image of the subject 900 is displayed on the display unit 151. In this case, the controller 180 of the mobile terminal 100 according to an embodiment of the present disclosure may analyze the flexion of the shape of the subject 900 from the preview image of the subject 900. In other words, as described in the foregoing FIG. 4, the controller 180 may analyze the number of flexions of the shape of the subject 900 and the complexity of the flexion, and partition a preview image displayed with the subject 900 into a plurality of regions based on the extent of the analyzed flexion.

Figure 9B:
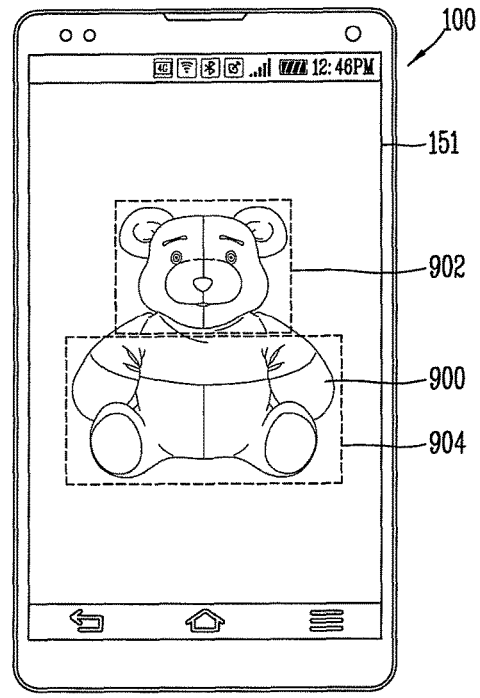

FIG. 9B illustrates an example of this case.

For example, the controller 180 may display a preview image of the subject 900 partitioned into a plurality of regions (first region: 902, second region: 904) based on the extent of the flexion of the shape of the subject 900 as illustrated in FIG. 9B. Hereinafter, it is assumed that a portion of the subject 900 corresponding to the first region 902 has a level lower than a preset value of the extent of flexion, and assumed that a portion of the subject 900 corresponding to the second region 904 has a level higher than a preset value of the extent of flexion.

In this case, the controller 180 may capture an image in a different capture scheme for each region corresponding to the first region 902 and second region 904. For example, the controller 180 may capture an image for a portion of the subject 900 corresponding to the first region 902 having a level lower than a preset value of the extent of flexion using a low resolution image or video recording scheme. However, the controller 180 may capture an image for a portion of the subject 900 corresponding to the second region 904 having a level higher than a preset value of the extent of flexion using a high resolution image capture scheme.

On the other hand, according to the foregoing description, it has been described that the controller 180 of the mobile terminal 100 according to an embodiment of the present disclosure may allow the user to select a capture scheme in advance prior to capturing an image for the subject. In this case, the controller 180 may display a graphic object capable of allowing the user to select an image capture scheme, and FIG. 9C illustrates such an example in which the graphic object can be displayed around a plurality of images divided according to the extent of the flexion.

Figure 9D:
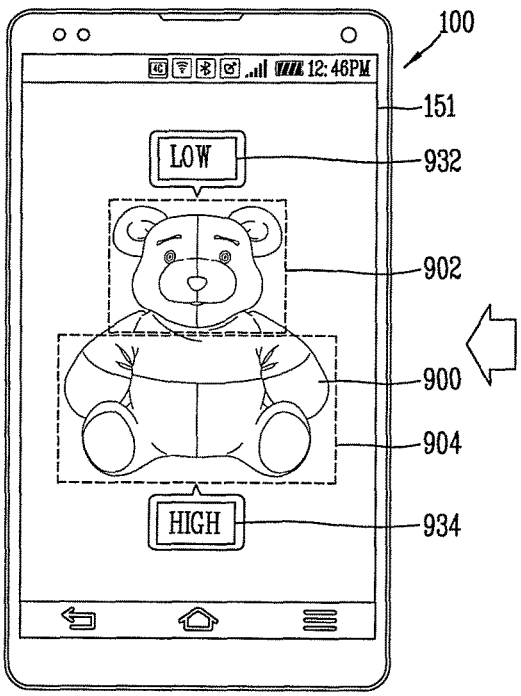
Figure 9C:
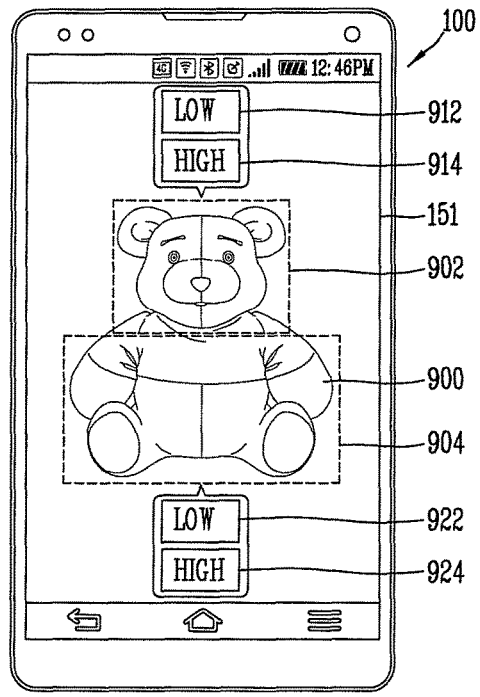

Referring to FIG. 9C, FIG. 9C illustrates an example in which graphic objects 912, 914, 922, 924 for allowing the user to select a capture scheme are displayed on the display unit 151. Here, the graphic object 912, 914 and graphic objects 922, 924 allow the user to select a capture scheme for the first region 902 and second region 904, respectively.

The user may determine a scheme of capturing an image of each portion of the subject 900 corresponding to the first region 902 and second region 904 through the graphic objects 912, 914, 922, 924. Here, assuming that the graphic objects 912, 922 displayed with "LOW" are low resolution image or video recording schemes, it is assumed that the graphic objects 914, 924 displayed with "HIGH" are high resolution image capture schemes. In this case, when the user selects the scheme of capturing a portion of the subject 900 corresponding to a region having a level lower than a preset value of the extent of flexion, namely, the first region 902, as a low resolution image capture scheme, and selects the scheme of capturing a portion of the subject 900 corresponding to a region having a level higher than a preset value of the extent of flexion, namely, the second region 904, as a high resolution image capture scheme, only graphic objects for displaying the capture schemes selected by the user may be displayed on the display unit 151. FIG. 9D illustrates such an example.

On the other hand, when a different capture scheme for each different portion of the subject 900 is selected as illustrated in FIG. 9D, the controller 180 may capture each portion of the subject 900 according to the determined different capture scheme. For example, the controller 180 may capture a portion of the subject 900 corresponding to the first region 902 with a low resolution image capture scheme through part of a plurality of lenses provided in the camera 121, and capture another portion of the subject 900 corresponding to the second region 904 with a high resolution image capture scheme through another part of the plurality of lenses. In other words, the controller 180 may group a plurality of lenses into a plurality of groups based on the regions of the subject divided according to the extent of the flexion, and determine a different image capture scheme based on the extent of the flexion of the corresponding subject shape for each of the group.

On the other hand, when there are a plurality of subjects, the controller 180 may also group such a plurality of lenses into a plurality of groups to capture each image.

Figure 10A:
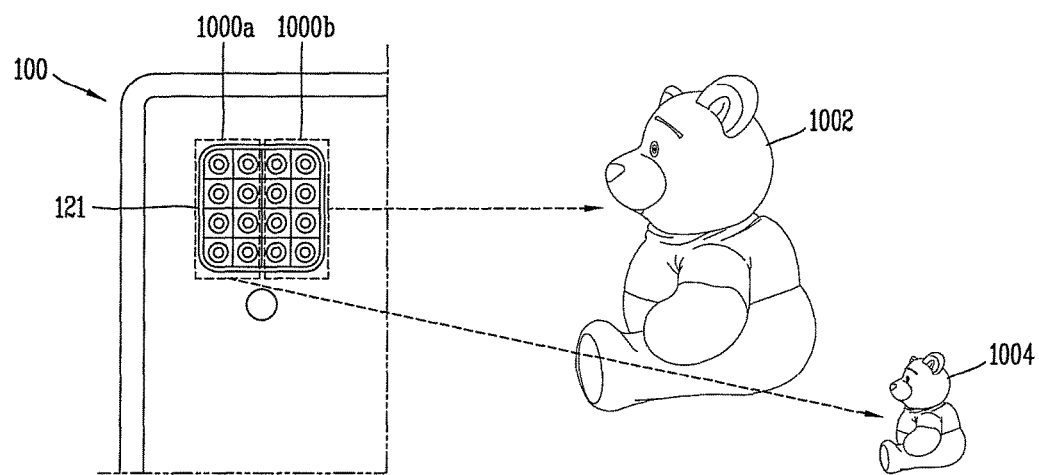
FIGS. 10A and 10B is an exemplary view illustrating example of acquiring 3D information on each subject when there are a plurality of subjects in a mobile terminal according to an embodiment of the present disclosure.
Figure 10B:
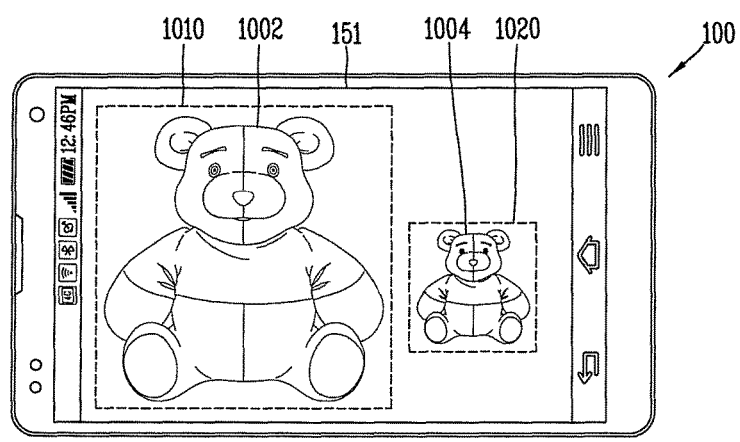

FIGS. 10A and 10B are exemplary views illustrating an example of acquiring 3D information on each subject when there are a plurality of subjects in a mobile terminal according to an embodiment of the present disclosure in such a case.

Referring to FIG. 10A, FIG. 10A illustrates an example in which a plurality of subjects 1002, 1004 are placed, and illustrates that a plurality of lenses provided in the camera 121 are grouped into a plurality of groups according to the number of the plurality of subjects.

In other words, when there are two subjects 1002, 1004 as illustrated in FIG. 10A, the controller 180 may group lenses provided in the camera 121 into two groups 1000a, 1000b to correspond to the two subjects, respectively. In this case, the controller 180 may set either one of the subjects to correspond to either one of the lens groups. Furthermore, the controller 180 may set each lens group to capture an image of the corresponding subject, respectively.

For example, as illustrated in FIG. 10A, when the first lens group 1000b is set to capture the first subject 1002, and the second lens group 1000a is set to capture the second subject 1004, the first lens group 1000b and second lens group 1000a may capture an image for the corresponding subjects 1002, 1004, respectively. Furthermore, when images captured in different directions for the subjects 1002, 1004 from the first lens group 1000b and second lens group 1000a are stored, the controller 180 may acquire 3D information for each face of the subjects 1002, 1004 using this. Furthermore, the controller 180 may generate information on a stereoscopic shape of the subjects 1002, 1004, respectively, using the acquired 3D information. Furthermore, 3D objects corresponding to the subjects 1002, 1004 may be of course generated using information on the stereoscopic shape to display it on the display unit 151. FIG. 10B illustrates such an example.

On the other hand, the controller 180 of the mobile terminal 100 according to an embodiment of the present disclosure may acquire 3D information from an image captured in a different scheme according to a composition capturing the subject. For example, the user may determine a composition at the time of the capturing from an image being received when capturing an image for a specific subject around the specific subject (first composition), and when capturing the user's surrounding around the user as a subject (second composition), and scan the subject with the relevant scheme to acquire 3D information.

Figure 11A:
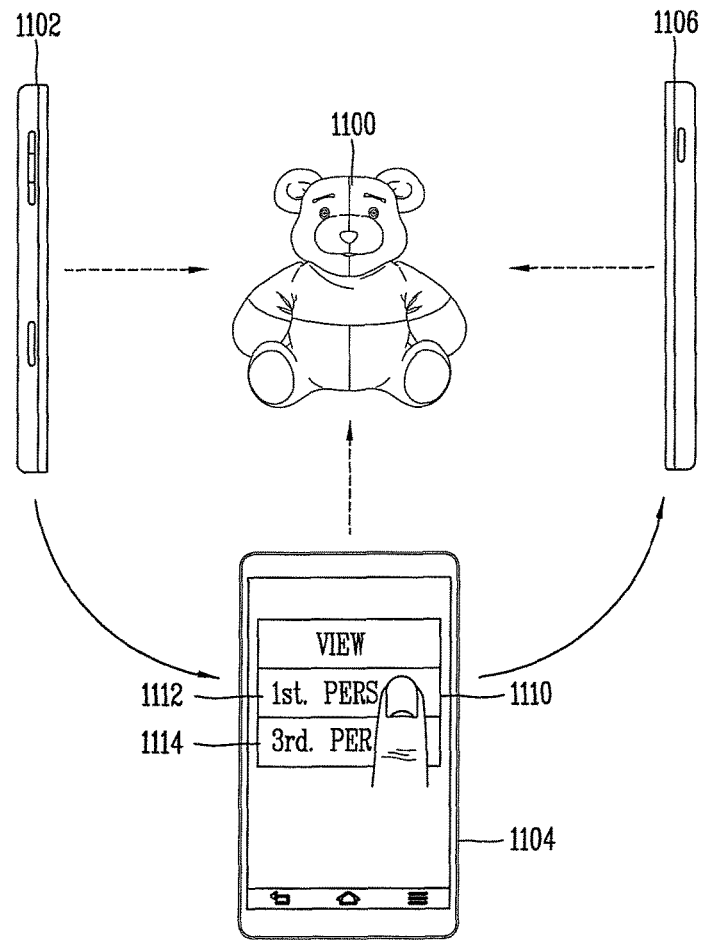
FIGS. 11A(a) and 11A(b) are exemplary views illustrating an example of capturing a subject with a different composition in a mobile terminal according to an embodiment of the present disclosure.
Figure 11A:
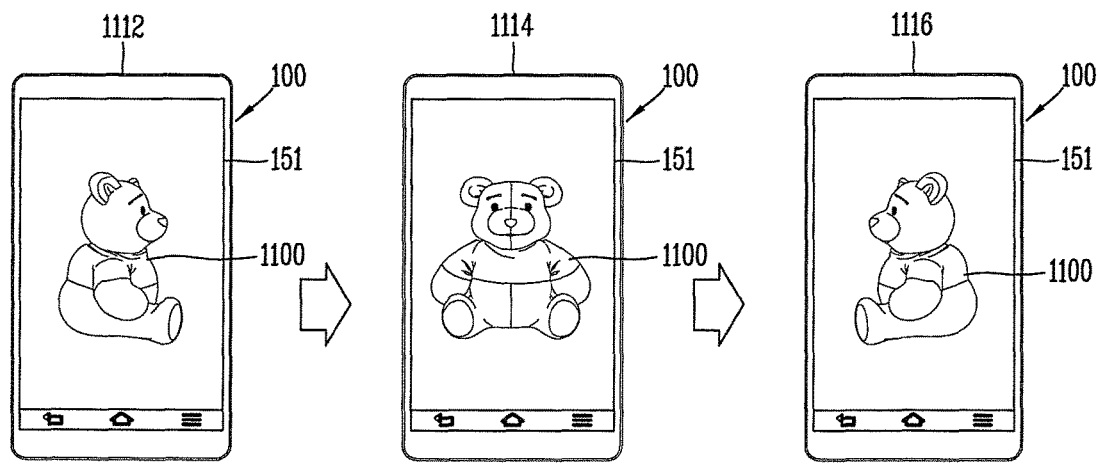
Figure 11B:
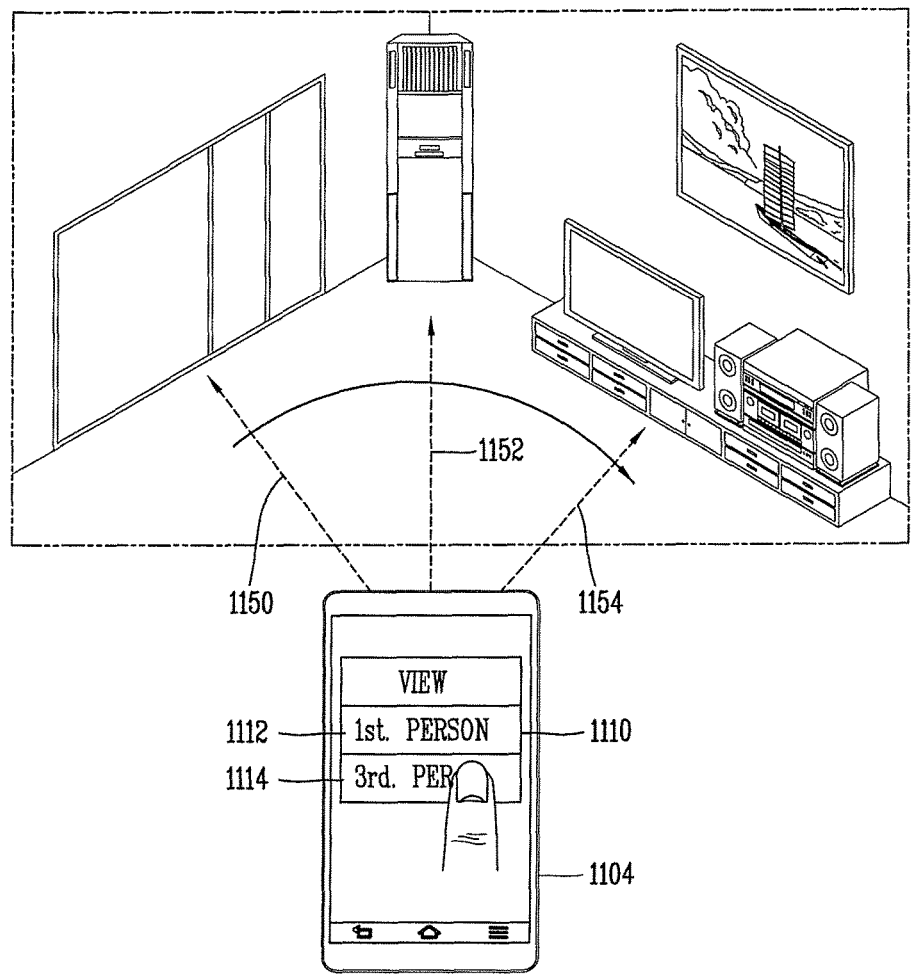
FIGS. 11B(a) and 11B(b) are exemplary views illustrating an example of capturing a subject with a different composition in a mobile terminal according to an embodiment of the present disclosure.
Figure 11B:
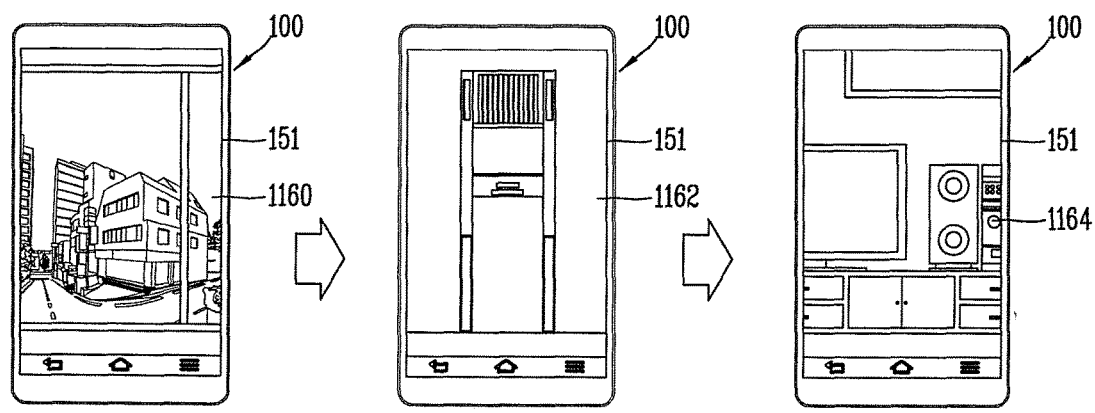

FIGS. 11A and 11B are exemplary views illustrating an example of capturing a subject with a different composition in a mobile terminal according to an embodiment of the present disclosure.

First, referring to FIG. 11A(a), FIG. 11A(a) illustrates an example of allowing a mobile terminal according to an embodiment of the present disclosure to capture an image for a specific subject 1100 around the specific subject 1100 (first composition). Furthermore, when capturing an image for a specific subject 1100 around the specific subject 1100 (first composition), the controller 180 may allow the user to select a composition capturing the specific subject 1100. In other words, as illustrated in FIG. 11A(a), The mobile terminal of claim 1, wherein controller 180 may display a graphic object 1110 for selecting a specific composition on the display unit 151.

In addition, as illustrated in FIG. 11A(a), when the user selects a first person view composition, the controller 180 may display the images of a subject 1100 captured around the specific subject 1100 on the display unit 151 as illustrated in FIG. 11A(b). Furthermore, the controller 180 may acquire 3D information on each face of the subject 1100 from the captured images.

On the other hand, FIG. 11B illustrates an example of capturing the user's surrounding around the user as a subject (second composition).

For example, as illustrated in FIG. 11B(a), when the user's surrounding around the user is captured as a subject, the controller 180 may allow the user to select a capture composition. In this case, the controller 180 may display the graphic object 1110 for allowing the user to select a specific composition, and store an image captured according to the selected composition, namely, a 3rd person view composition.

For example, as illustrated in FIG. 11B(a), when the mobile terminal 100 captures an image in the direction of looking at a window (1150), the direction of looking at an air conditioner (1152), and the direction of looking at a TV (1154) around the user in the room, the controller 180 may store the captured image as an image based on a third person view composition.

In this case, the controller 180 may display images captured of the user's surrounding around the user according to a currently selected composition, namely, third person view composition, on the display unit 151 as illustrated in FIG. 11B(b). Furthermore, the controller 180 may acquire 3D information on the user's surrounding environment from the captured images.

On the other hand, according to the foregoing description, it has been described that the controller 180 of the mobile terminal 100 according to an embodiment of the present disclosure acquires 3D information on each face of the subject using an image captured of a specific subject in different directions and generates information on a stereoscopic shape associated with the subject using the acquired information. Accordingly, in case of the present disclosure, though a specific subject is captured in different directions, a distance to the subject and a location at which the subject is displayed in an image captured of the subject may be maintained in the same or similar manner to some extent.

Accordingly, according to the foregoing description, when an image captured of another face of the subject is received, the controller 180 of the mobile terminal 100 according to an embodiment of the present disclosure may determine whether or not an image of the subject is correctly captured based on an image previously captured of the subject, and display guide information containing the determination result for the user.

Figure 12A:
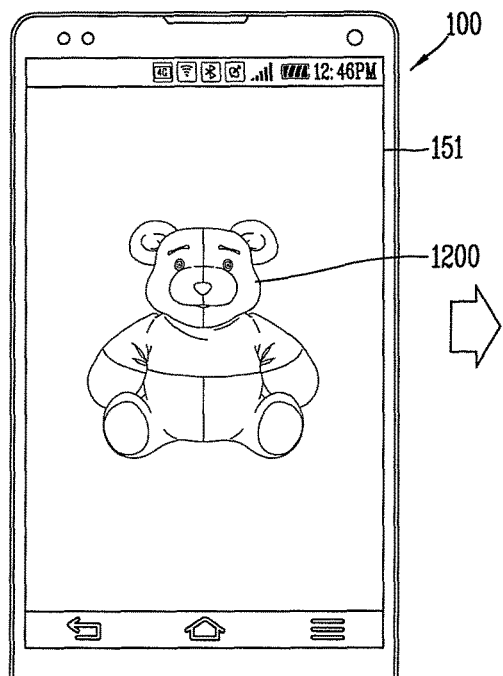
FIGS. 12A(a), 12A(b), 12A(c) and 12A(d) are exemplary views illustrating an example of displaying guide information based on a location at which a subject is displayed on a preview image and a focal distance to the subject in a mobile terminal according to an embodiment of the present disclosure.
Figure 12A:
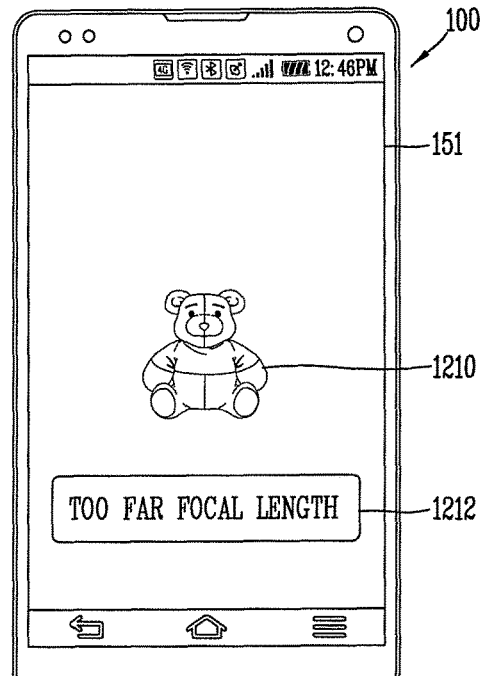
Figure 12A:
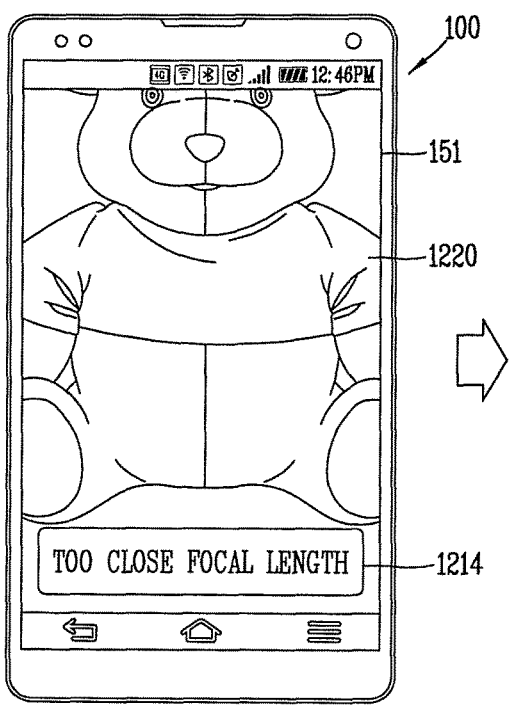
Figure 12A:
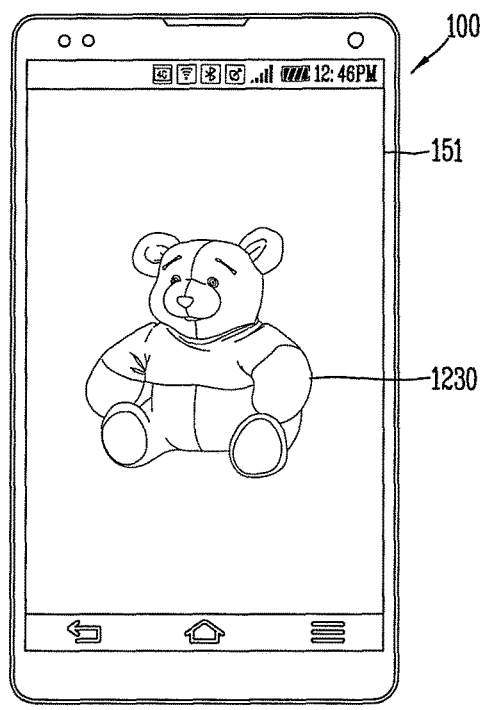
Figure 12B:
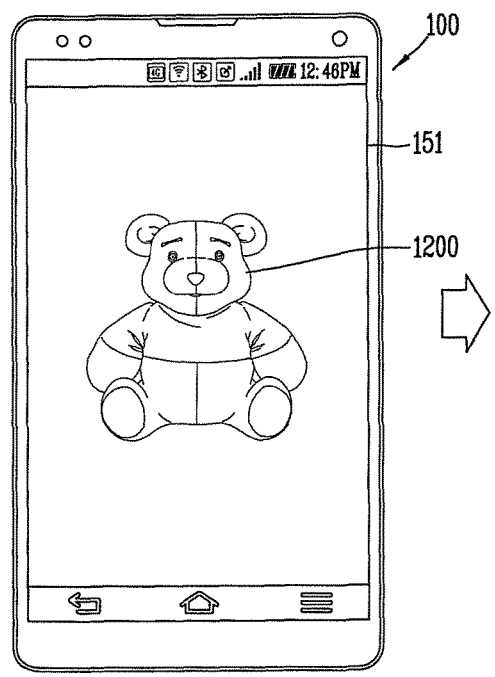
FIGS. 12B(a), 12B(b), 12B(c) and 12B(d) are exemplary views illustrating an example of displaying guide information based on a location at which a subject is displayed on a preview image and a focal distance to the subject in a mobile terminal according to an embodiment of the present disclosure.
Figure 12B:
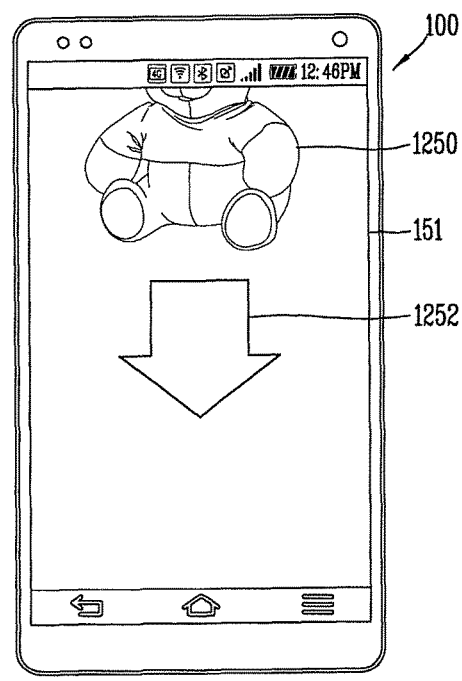
Figure 12B:
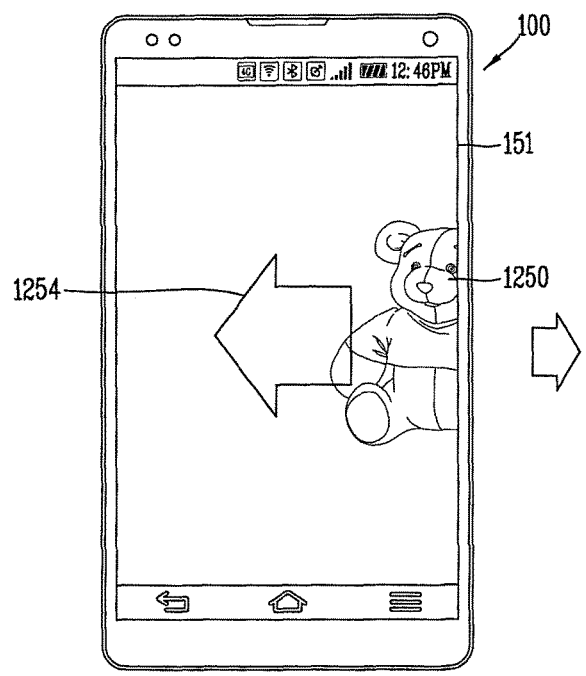
Figure 12B:
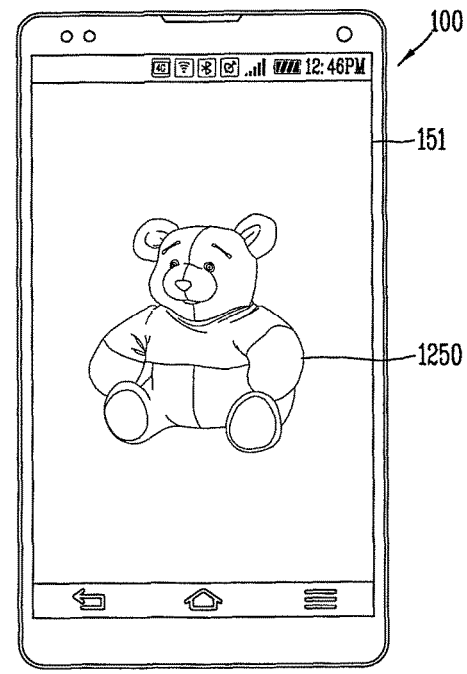

FIGS. 12A and 12B are exemplary views illustrating an example of displaying guide information based on a location at which a subject is displayed on a preview image and a focal distance to the subject in a mobile terminal according to an embodiment of the present disclosure.

First, referring to FIG. 12A, FIG. 12A illustrates an example of displaying guide information according to a distance between the subject and the camera 121, and FIG. 12B illustrates an example of displaying guide information based on a location at which the subject is displayed on an image capturing the subject.

First, referring to FIG. 12A, FIG. 12A(a) illustrates an example of an image of the subject 1200 that has captured first. In this case, when another image associated with the subject 1200 is received from the camera 121, the controller 180 may display the guide information on the display unit 151 based on a distance between the camera 121 and the subject 1200.

For example, in case where a distance between the camera 121 and the subject 1200 is changed by more than a predetermined amount when the user captures another image associated with 1200 subsequent to capturing an image shown in the above FIG. 12A(a), the controller 180 may display information for notifying it to the user on the display unit 151. In other words, when a distance between the camera 121 and the subject 1200 is away from each other as illustrated in FIG. 12A(b), the controller 180 may display guide information 1211 indicating that the focal distance is too far away on the display unit 151 as illustrated in FIG. 12A(b).

On the contrary, when a distance between the camera 121 and the subject 1200 is too close from each other as illustrated in FIG. 12A(c), the controller 180 may display guide information 1212 or 1214 indicating that the focal distance is too close on the display unit 151. In this case, the user may recognize that a distance between the subject 1200 and the camera 121 is currently wrong through the guide information 1212 or 1214, thereby adjusting a distance between the subject 1200 and the camera 121 or a focal distance of the camera 121. Furthermore, FIG. 12A(d) illustrates an example in which a distance between the subject 1200 and the camera 121 or a focal distance of the camera 121 is adjusted.

On the other hand, according to the foregoing description, it has been described that the guide information may include information associated with a location at which the subject 1200 is displayed on an image captured of the subject 1200. FIG. 12B illustrates such an example.

For example, when a previously captured image is se fuel table to a reference as illustrated in FIG. 12B(a), the controller 180 may determine whether or not the location of the subject 1200 is wrong on other images based on the location at which the subject 1200 is displayed in FIG. 12B(a). For example, as illustrated in FIG. 12B(b), when the subject 1200 is displayed higher than the location of the subject 1200 shown in FIG. 12B(a) on a newly received image for another face of the subject 1200, the controller 180 may display guide information such as an arrow-shaped graphic object 1252 to notify that the current location of the subject 1200 is wrong, and display guide information for a direction capable of correctly modifying it.

On the other hand, similarly to this, as illustrated in FIG. 12B(c), when the subject 1200 is displayed out of position to one side from the location of the subject 1200 shown in FIG. 12B(a) on a newly received image for another face of the subject 1200, the controller 180 may display guide information such as an arrow-shaped graphic object 1254 to notify that the current location of the subject 1200 is wrong, and display guide information for a direction capable of correctly modifying it. Furthermore, when the user modifies a location at which the subject 1200 is displayed based on the guide information 1252, 1254, the subject 1200 may be displayed at a location set to a reference (a location of the subject 1200 in FIG. 12B(a)) as illustrated in FIG. 12B(d).

On the other hand, according to the foregoing description, it has been described that when sufficient 3D information on all the faces of the subject are not acquired, the controller 180 of the mobile terminal 100 according to an embodiment of the present disclosure may display a graphic image associated therewith.

Figure 13A:
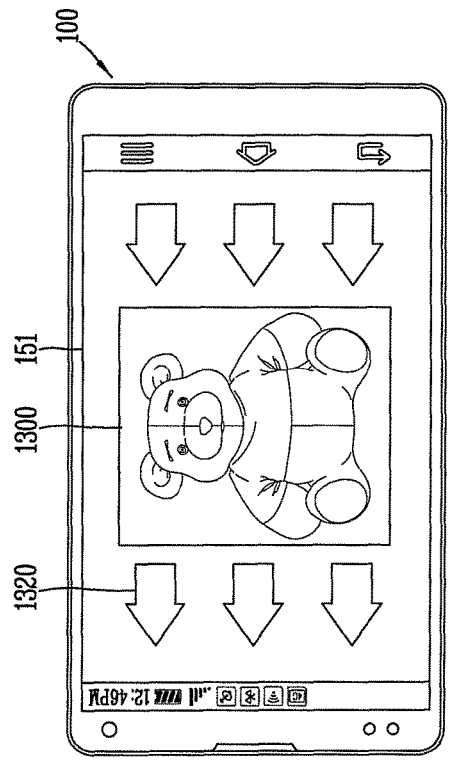
FIGS. 13A(a), 13A(b), 13A(c) and 13A(d) are exemplary views illustrating an example of displaying guide information for indicating a specific face of a subject requiring the acquisition of 3D information in such a mobile terminal according to an embodiment of the present disclosure.
Figure 13A:
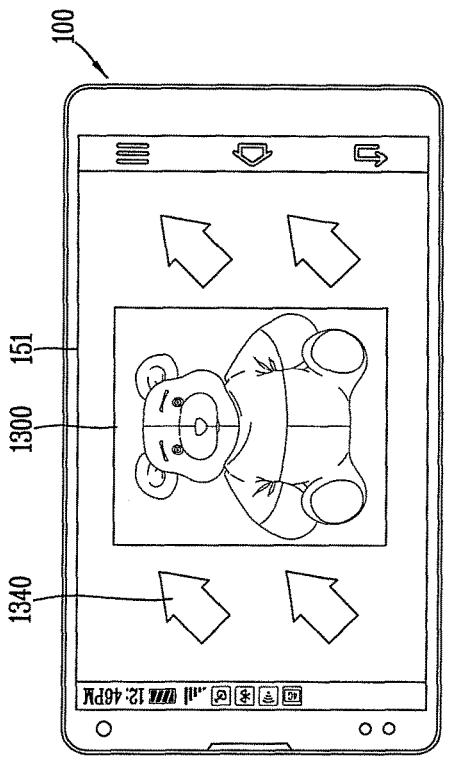
Figure 13A:
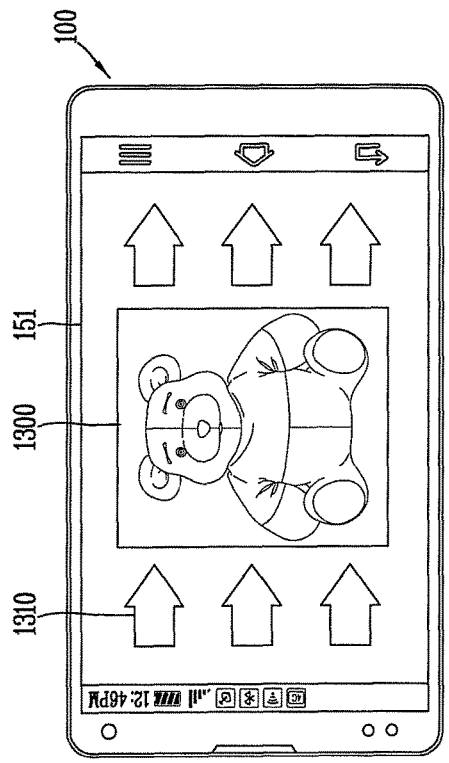
Figure 13A:
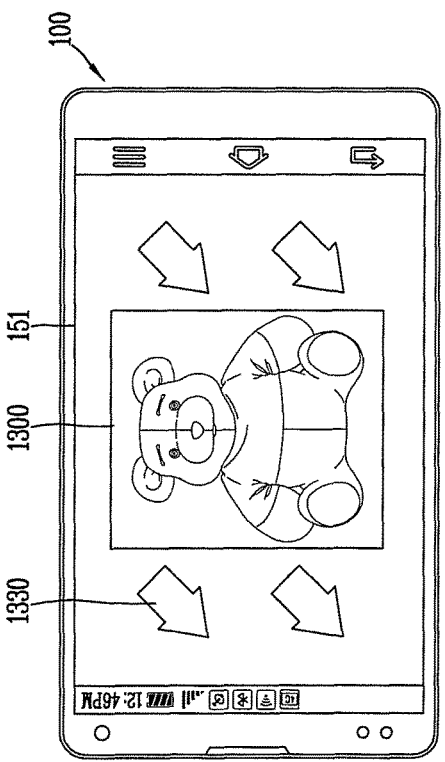

FIGS. 13A and 13B are exemplary views illustrating an example of displaying guide information for indicating a specific face of a subject requiring the acquisition of 3D information in such a mobile terminal according to an embodiment of the present disclosure.

When determined that 3D information on a specific face of the subject is additionally required, the mobile terminal 100 according to an embodiment of the present disclosure may request the user to further capture an image for the specific face of the subject. For example, when there is a face for which sufficient 3D information has not been acquired or there is a face that has not been captured yet while generating information on a stereoscopic shape of the subject 1300, the controller 180 may determine that an image for the specific face of the subject 1300 is further required. In this case, the specific face may be displayed as guide information including information on a specific direction based on one face of the subject currently displayed on the display unit 151.

For example, when determined that 3D information on a right face of the subject 1300 is further required, the controller 180 of the mobile terminal 100 according to an embodiment of the present disclosure may display an arrow-shaped graphic object indicating the right direction around the currently display surface of the subject 1300 on the display unit 151 as illustrated in FIG. 13A(a). Furthermore, on the contrary, 3D information on a left face of the subject 1300 is further required, the controller 180 of the mobile terminal 100 according to an embodiment of the present disclosure may display an arrow-shaped graphic object indicating the left direction around the currently display surface of the subject 1300 on the display unit 151 as illustrated in FIG. 13A(b).

On the other hand, the arrow-shaped guide information may be used in various ways. For example, the controller 180 may display a current distance between the subject 1300 and the camera, namely, information on a focal distance using the arrow-shaped guide information. For example, the controller 180 may recognize a depth distance of the subject 1300 through 3D information on a specific face of the subject 1300 currently displayed on the display unit 151, and display guide information according to the recognized depth distance.

For example, when the recognized depth distance is less than a preset level, the controller 180 may display guide information 1330 shown in FIG. 13A(c). On the contrary, when the recognized depth distance is greater than a preset level, the controller 180 may display guide information 1330 shown in FIG. 13A(d). In this case, the user may know a depth distance currently recognized from the subject 1300 through the guide information 1330 or 1340, and thus appropriately adjust a distance between the subject 1300 and the camera 121.

On the other hand, the controller 180 may directly display information on a specific face of the subject using various forms of guide information as well as such an arrow-shaped guide information. For example, the controller 180 may display a separate graphic object corresponding to each face of the subject, and display a specific face requiring additional 3D information using the graphic object. Otherwise, the controller 180 may display a portion corresponding to the specific face requiring the additional 3D information on an image of the subject to be distinguished from the other portion of the image or display only a specific portion requiring the additional 3D information on an image of the subject to be distinguished from the other portion of the image.

FIGS. 13B(a), 13B(b) and 13B(c) illustrate such an example.

First, referring to FIG. 13B(a), the controller 180 may display separate graphic objects 1350 corresponding to different faces of the subject 1300, and display a graphic object 1352 corresponding to a specific face requiring additional 3D information among the graphic objects 1350 to be distinguished form the other graphic objects. Otherwise, as illustrated in FIG. 13B(b), the controller 180 may display a face 1360 requiring the acquisition of addition 3D information to be distinguished from the other portion thereof on an image in which a specific face of the subject 1300 is displayed.

On the other hand, the controller 180 of the mobile terminal 100 according to an embodiment of the present disclosure may display only a specific portion requiring the additional 3D information on the image of the subject to be distinguished from the other portion thereof. For example, when 3D information is insufficient while generating a 3D object corresponding to the subject 1300, the controller 180 may generate a 3D object in an incomplete state, and display the incomplete portion 1370 in a distinguished manner as illustrated in FIG. 13B(c). In this case, the user may further capture an image corresponding to the incomplete portion 1370 to supplement an image of a face additionally requiring the acquisition of the 3D information, and the controller 180 may complete the incomplete portion 1370 using the supplemented image.

On the other hand, the controller 180 of the mobile terminal 100 according to an embodiment of the present disclosure may complete the incomplete portion 1370 without the supplemented image. For example, as illustrated in FIG. 13B(c), when a portion 1370 of the 3D object corresponding to the subject 1300 is in an incomplete state, the controller 180 may generate the incomplete portion 1370 using 3D information acquired from another face of the subject 1300 similar thereto.

For example, the controller 180 may acquire 3D information on a stereoscopic shape of the subject 1300 from 3D information on another face of the subject 1300 symmetric to the specific face to acquire 3D information on the incomplete portion 1370. In other words, as illustrated in FIG. 13B(c), when there is the incomplete portion 1370, the controller 180 may detect another face of the subject 1300 symmetric to a face containing the incomplete portion 1370. Furthermore, the controller 180 may acquire the 3D information of another face corresponding to the incomplete portion 1370 around a symmetric reference line 1372 according to the detection result, and generate information on a stereoscopic shape corresponding to the incomplete portion 1370 using this, as illustrated in FIG. 13B(d).

On the other hand, the controller 180 of the mobile terminal 100 according to an embodiment of the present disclosure may display 3D information corresponding to the subject on the display unit 151 in various ways according to the user's selection based on the acquired stereoscopic shape.

FIGS. 14A to 14D, 15A to 15C, and 16A to 16D illustrate examples of displaying a 3D object corresponding to the subject in various ways based on a user's touch input in a mobile terminal according to an embodiment of the present disclosure.

The controller 180 of the mobile terminal 100 according to an embodiment of the present disclosure may generate display a 3D object corresponding to the subject using a plurality of 3D information acquired for different faces of the subject, and display it on the display unit 151. In this case, the controller 180 may display an image in which the 3D object is seen from a specific face based on a user's touch input.

Figure 14A:
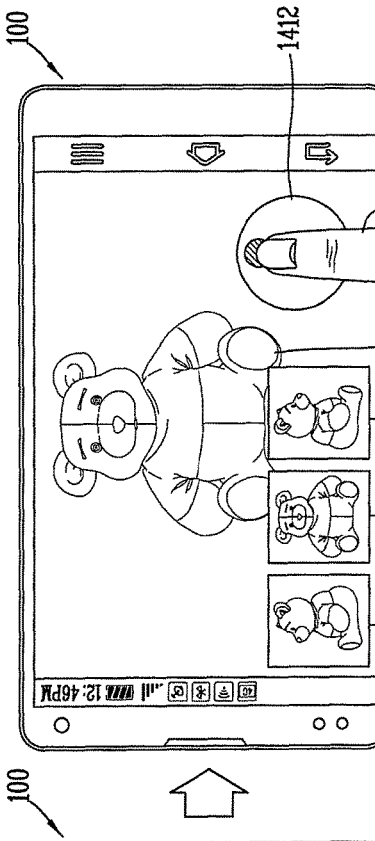
FIGS. 14A, 14B, 14C and 14D are exemplary views illustrating an example of displaying a 3D object corresponding to a subject based on a user's touch input in a mobile terminal according to an embodiment of the present disclosure.

First, referring to FIG. 14A to 14D, a 3D object 1400 corresponding to the subject may be displayed on the display unit 151 as illustrated in FIG. 14A, and images 1402, 1404, 1406 in which the 3D object is seen from different faces may be further displayed at least one portion of the display unit 151.

In this state, the controller 180 may sense a user's touch input applied to the display unit 151, and display different faces for the 3D object based on the touch input and a drag input applied subsequent to the touch input.

Figure 14B:
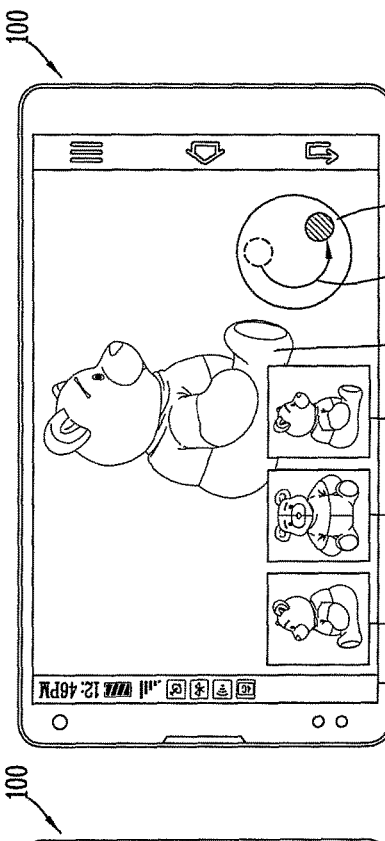
Figure 14C:
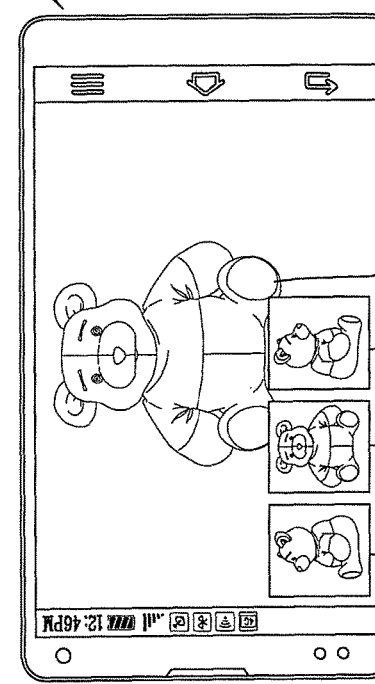

For example, as illustrated in FIG. 14B, when a user's touch input 1412 is sensed on one region 1402 of the display unit 151, the controller 180 may rotate a 3D object displayed on the display unit 151 according to a drag input applied subsequent to the user's touch input 1412. In other words, as illustrated in FIG. 14C, when a drag input 1416 is applied in a clockwise direction subsequent to the user's touch input 1412, the controller 180 may display a state in which the 3D object 1400 is rotated in a right direction based on the drag input 1416 in such a clockwise direction on the display unit 151.

Figure 14D:
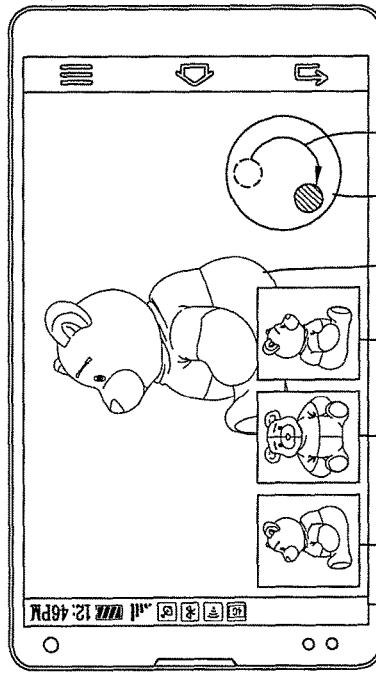

However, on the contrary, as illustrated in FIG. 14D, when a drag input 1416 is applied in a counter-clockwise direction subsequent to the user's touch input 1412, the controller 180 may display a state in which the 3D object 1400 is rotated in a left direction based on the drag input 1416 in such a counter-clockwise direction on the display unit 151. Here, the controller 180 may of course determine an angle by which the 3D object 1400 is rotated in a left or right direction based on the extent of applying the drag input 1416, namely, a distance over which the drag input is applied.

Figure 15A:
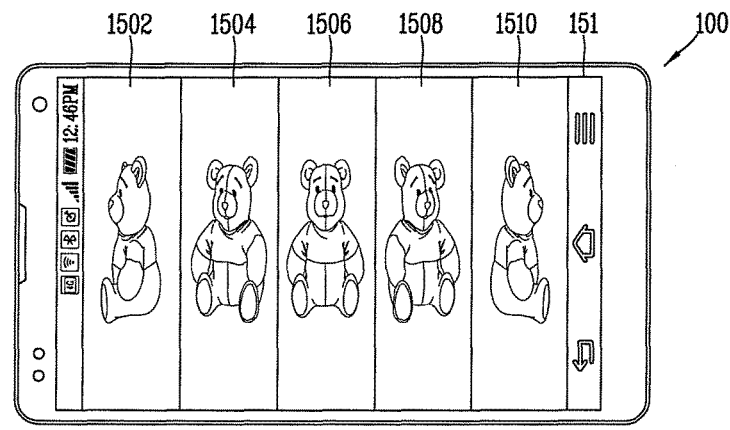
FIGS. 15A, 15B and 15C are exemplary views illustrating an example of displaying a 3D object corresponding to a subject based on a user's touch input in a mobile terminal according to an embodiment of the present disclosure.
Figure 15B:
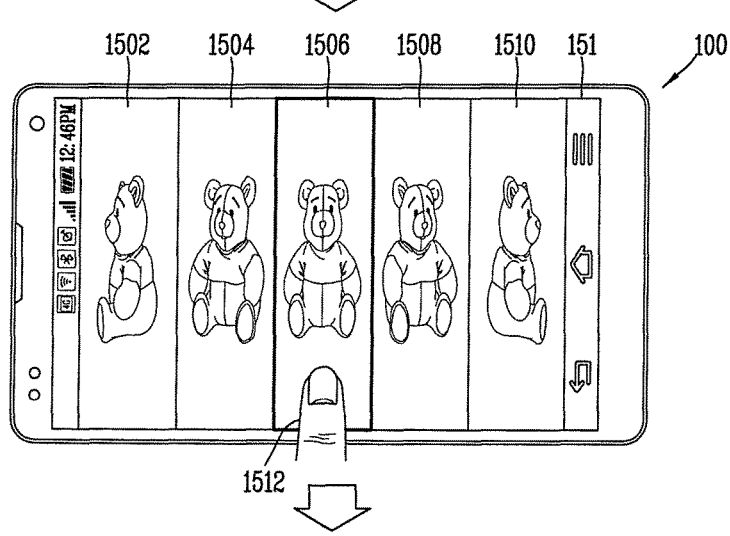
Figure 15C:
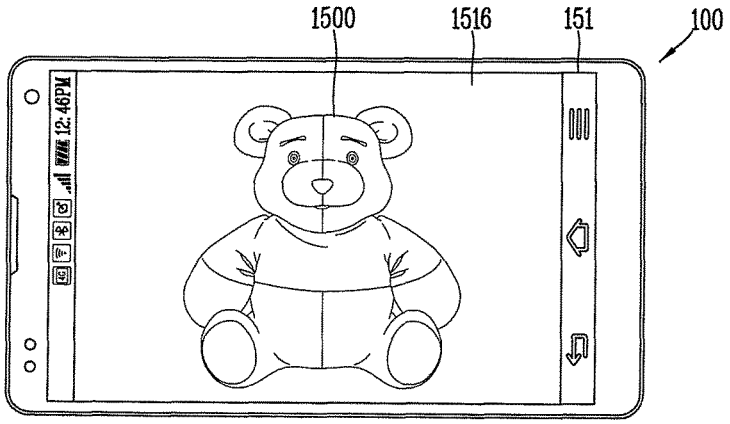

On the other hand, on the contrary, the controller 180 of the mobile terminal 100 according to an embodiment of the present disclosure may of course display images in which the 3D object is seen from different faces on the display unit 151, and allow the user to select at least one of the displayed images. FIG. 15A to 15c illustrate such an example.

First, referring to FIG. 15A, the controller 180 of the mobile terminal 100 according to an embodiment of the present disclosure may partition the display unit 151 into a plurality of regions, and display images in which the generated 3D object is seen from different directions in each of the partitioned regions. In this state, the controller 180 may sense a user's selection to any one 1506 of the plurality of images displayed on the display unit 151 as illustrated in FIG. 15B. Furthermore, the controller 180 may display the selected any one image 1506 in an original size or enlarged size on the display unit 151 as illustrated in FIG. 15C.

On the other hand, as illustrated in FIG. 15B, the controller 180 may allow the user to select a plurality of images in a state that the plurality of images are displayed. In this case, the controller 180 may sequentially display the plurality of images selected by the user in a preset order as illustrated in FIG. 15C. Here, the preset order may be an order determined according to the direction of rotating the 3D object determined based on images selected by the user or an order of selecting the images by the user.

On the other hand, the controller 180 of the mobile terminal 100 according to an embodiment of the present disclosure may display the generated 3D object in a different manner from this on the display unit 151. For example, the controller 180 may change a state in which the 3D object is displayed based on an area of a region in which a user's touch input is sensed and a direction of changing the region on the display unit 151.

FIGS. 16A to 16D illustrate such examples. For example, as illustrated in the first drawing of FIG. 16A, when the 3D object 1600 is displayed on the display unit 151, the controller 180 may sense a user's touch input applied to the display unit 151. Furthermore, when a user's touch input is sensed, the controller 180 may recognize a region in which the touch input is sensed as illustrated in the second drawing of FIG. 16A.

In this state, the controller 180 may sense whether or not a change of the recognized region has been made. For example, when a user rolls his or her finger applying a touch input in a left direction as illustrated in the second drawing of FIG. 16B while applying the touch input as illustrated in the first drawing of FIG. 16A, the controller 180 may recognize a touch input region changed based on the user's finger rolling. In other words, when a user's finger rolling is sensed as illustrated in the first drawing of FIG. 16B, the controller 180 may sense that a touch input region 1622 shown in the second drawing of FIG. 16B has been changed, and recognize the changed state.

Furthermore, the controller 180 may display a state in which the 3D object 1600 is rotated based on the changed touch input region 1622 on the display unit 151. In other words, the controller 180 may compare an initial touch input region 1612 with the touch input region 1622 changed according to the finger rolling to rotate the 3D object 1600 on the display unit 151 based on a changed area of the touch input region and a changed direction of the touch input region.

Figure 16B:
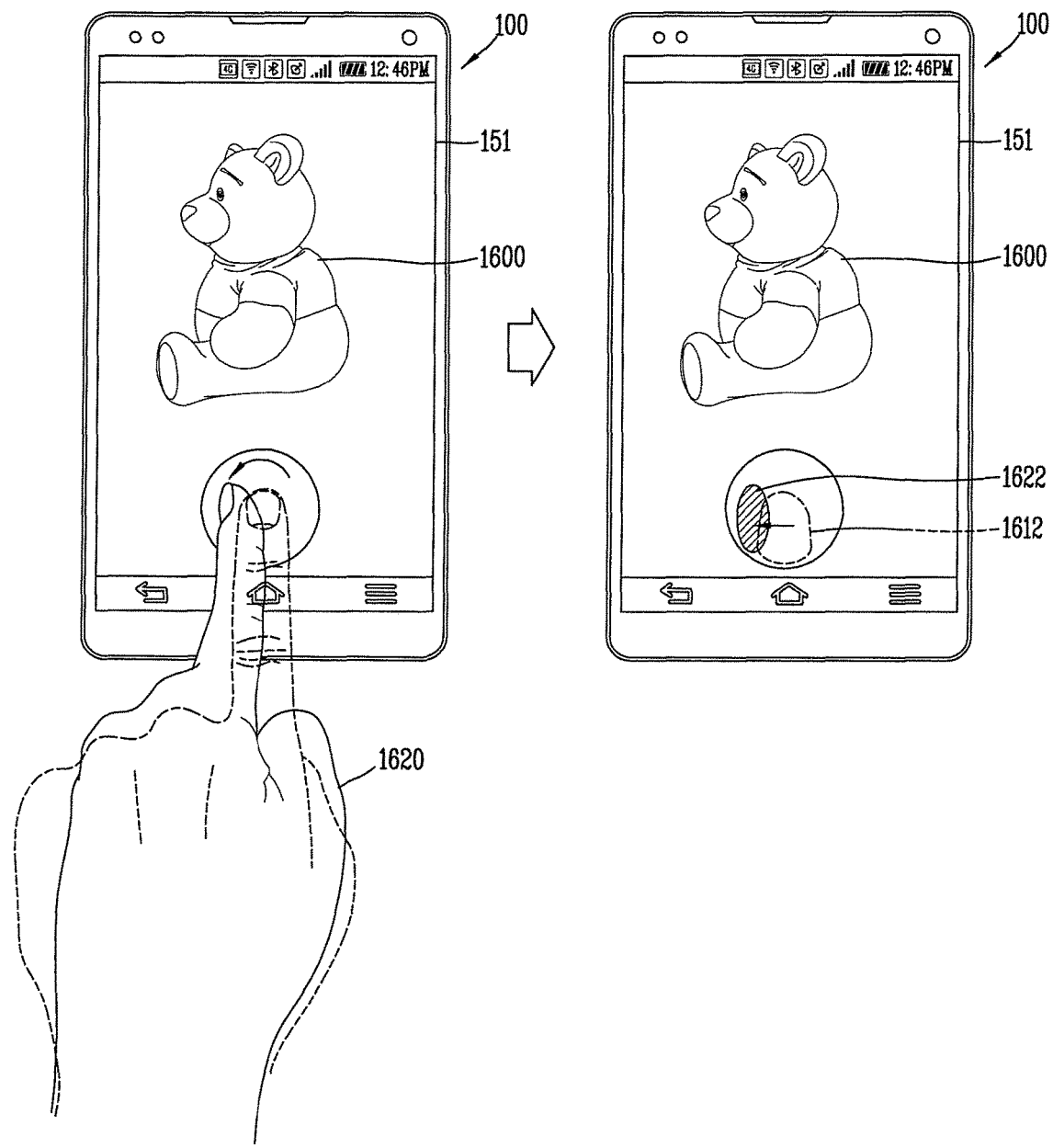

Accordingly, as illustrated in the first and second drawings of FIG. 16B, when the user rolls his or her finger applying a touch input in a left direction, the controller 180 may display a state in which the 3D object 1600 is rotated in a left direction on the display unit 151, thereby displaying an image for the left face of the 3D object 1600 on the display unit 151.

Figure 16C:
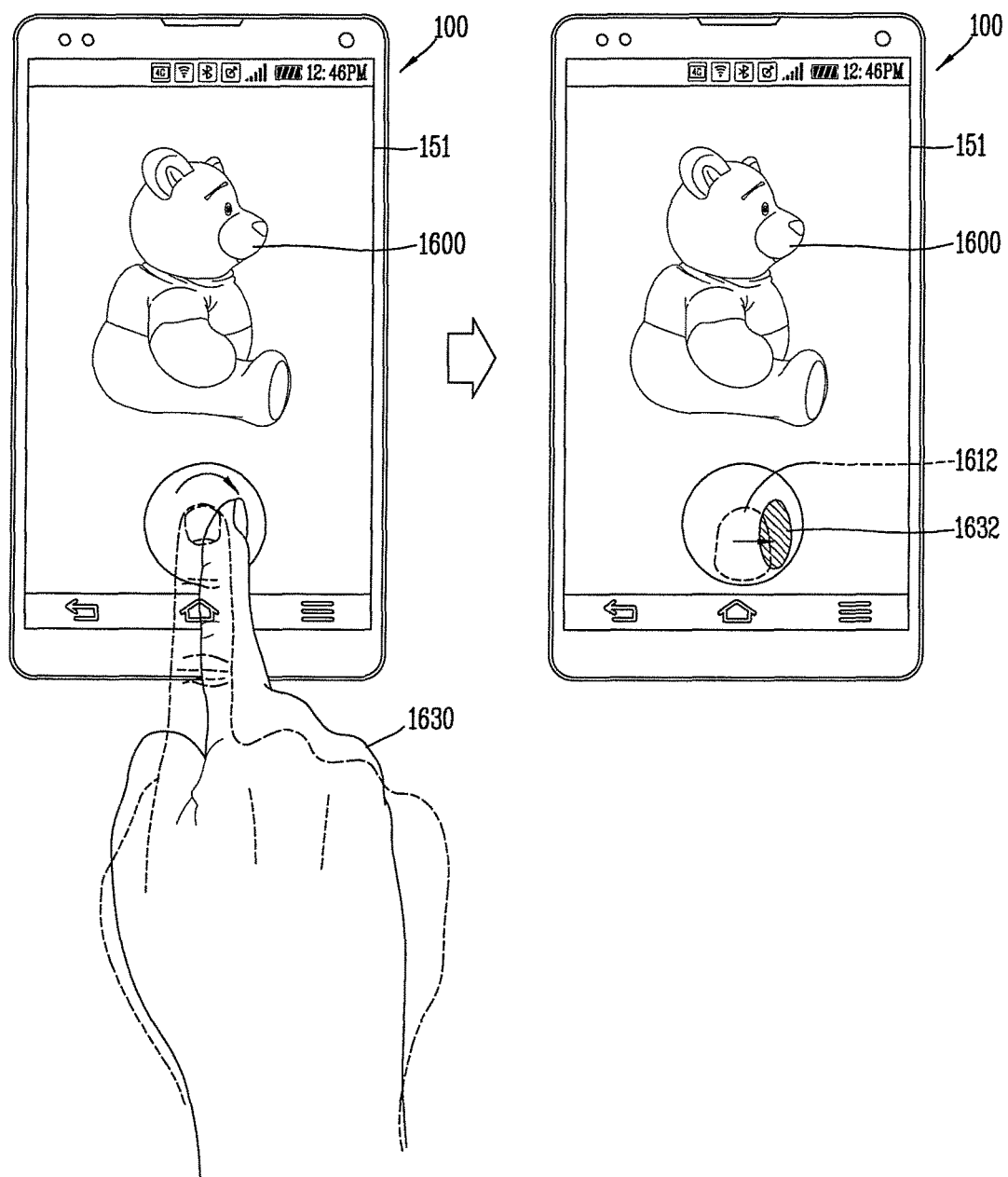

On the other hand, it is assumed in FIG. 16C that the user rolls his or her finger applying a touch input in a right direction. In this case, the controller 180 may recognize a changed touch input region based on the user's finger rolling as illustrated in the first drawing of FIG. 16C. Furthermore, the controller 180 may display a state in which the 3D object 1600 is rotated in a right direction on the display unit 151. Accordingly, as illustrated in the first and second drawings of FIG. 16C, when the user rolls his or her finger applying a touch input in a right direction, the controller 180 may display a state in which the 3D object 1600 is rotated in a right direction on the display unit 151, and accordingly, an image for a right face of the 3D object 1600 may be displayed on the display unit 151.

Figure 16D:
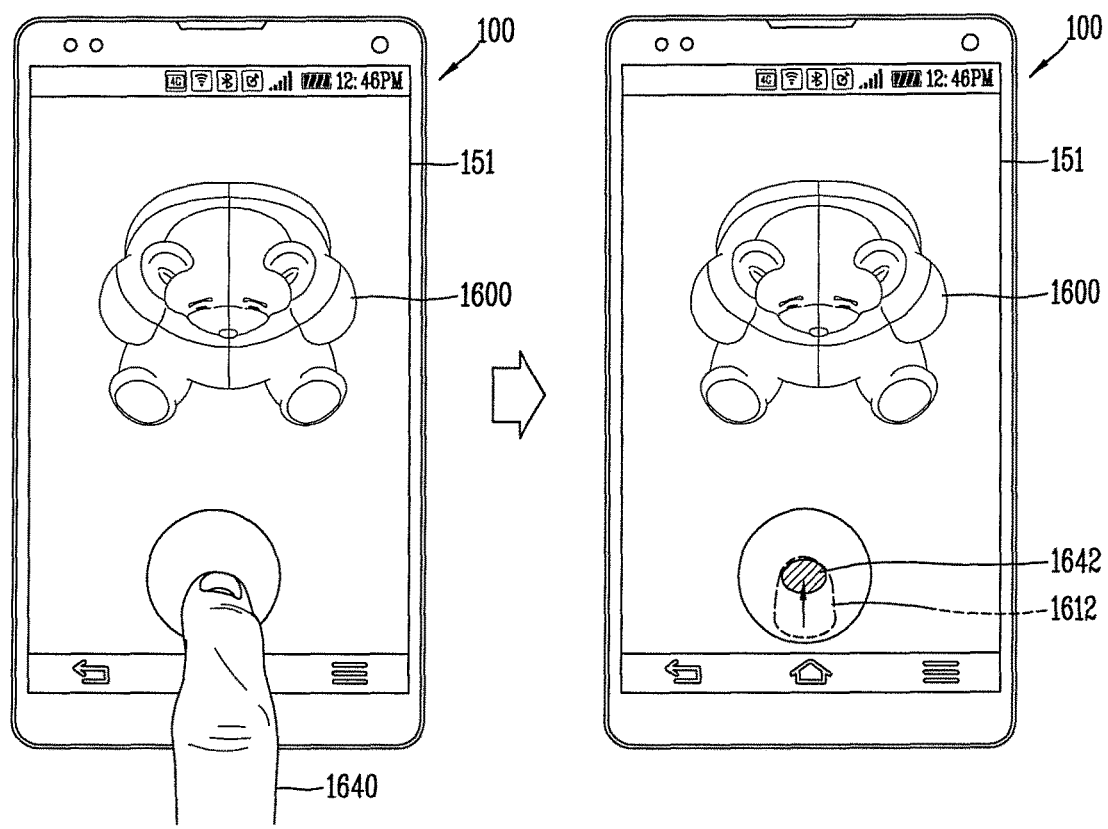

On the other hand, as described above, the controller 180 may generate a 3D object using information on a stereoscopic shape associated with the subject, and display the 3D object on the display unit 151. Furthermore, in this case, the 3D object may be of course rotated in a longitudinal direction, and thus displayed in a state that the 3D object is seen in an up or down direction, namely, as well as in a transverse direction, namely, in a left or right direction, In this case, the controller 180 of the mobile terminal 100 according to an embodiment of the present disclosure may of course display a state in which the 3D object is rotated in a longitudinal direction on the display unit 151 based on a region in which the touch input is recognized and a direction in which the region is changed. FIG. 16D illustrates such an example.

The controller 180 may sense a state in which a touch input applying to the display unit 151 is changed. In other words, for example, in a state that a user applies a touch input while his or her finger is laid down as illustrated in the first drawing of FIG. 16A, when a touch input is applied while his or her finger is erected as illustrated in the first drawing of FIG. 16D, the controller 180 may recognize the resultant change of the touch input region.

In other words, as illustrated in the second drawing of FIG. 16D, when the user erects his or her finger (second touch input) while applying a touch input (first touch input) in a state that his or her finger is laid down, the touch input region may be changed from a region 1612 corresponding to a first touch input to a region 1642 corresponding to a second touch input.

The controller 180 may recognize a state that the touch input has been changed based on such a changed touch input region, thereby changing a state that the 3D object is displayed on the display unit 151. In other words, when the user erects his or her finger as illustrated in the first drawing of FIG. 16D, the controller 180 may allow the user to rotate the 3D object in a longitudinal direction (for example, downward direction), thereby displaying an image in which the 3D object is seen from the top on the display unit 151.

On the other hand, in the foregoing description, a method of generating information on a stereoscopic shape associated with the subject using images in which a specific subject is captured from different face in a transverse direction has been described as an example, but the information on a stereoscopic shape associated with the subject may be of course generated using images in which the subject is captured in a longitudinal direction as well as in a transverse direction.

Figure 17A:
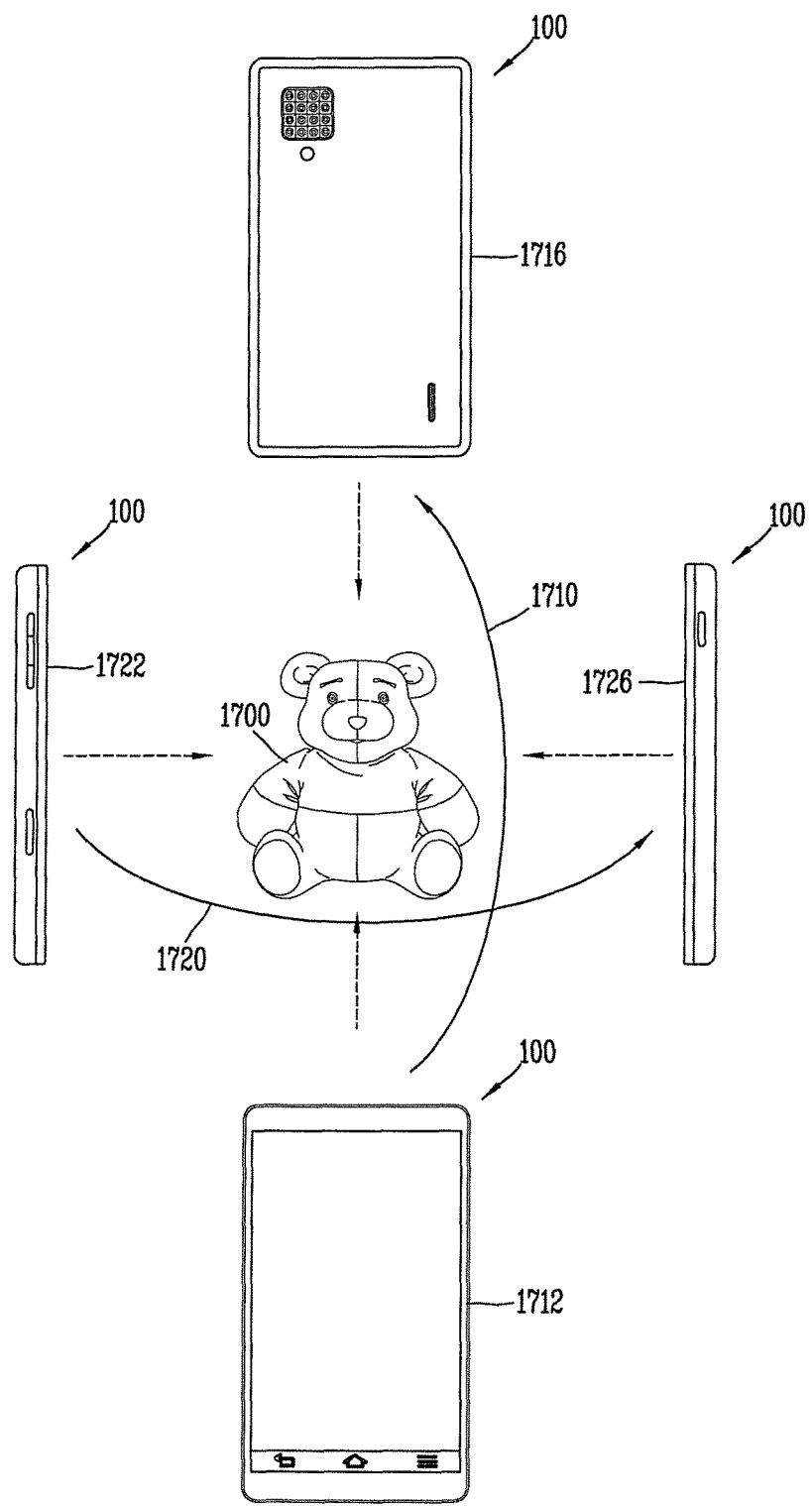
FIGS. 17A, 17B(a), 17B(b), 17B(c), 17C(a), 17C(b) and 17C(c) are conceptual views illustrating an example of capturing a plurality of images for a longitudinal face as well as a transverse face of the subject in a mobile terminal according to an embodiment of the present disclosure.
Figure 17B:
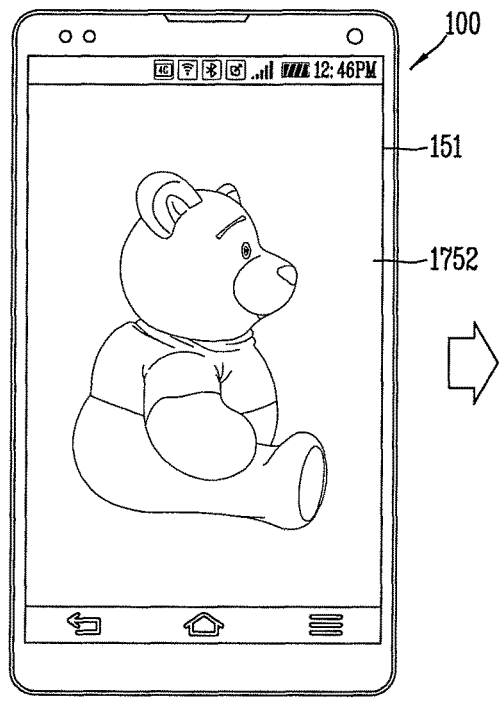
Figure 17B:
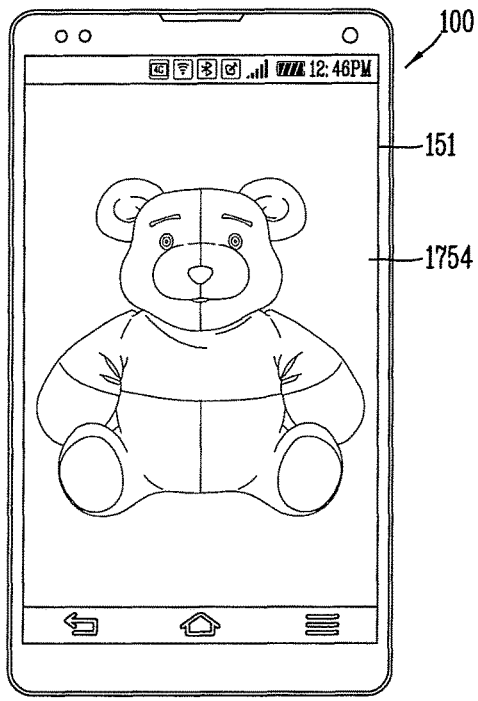
Figure 17B:
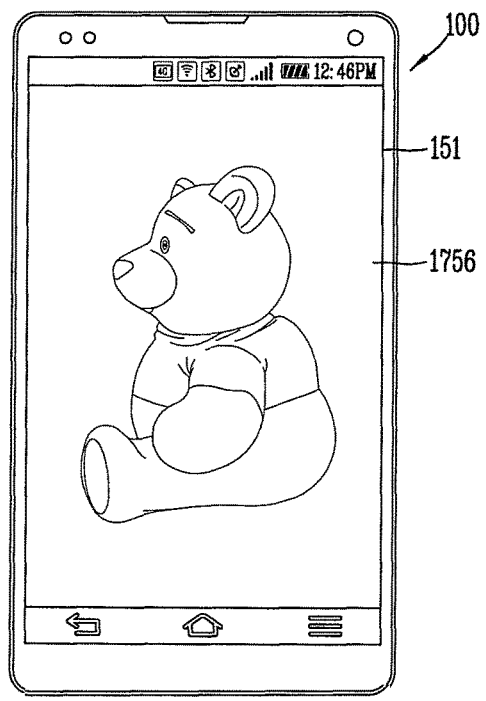
Figure 17C:
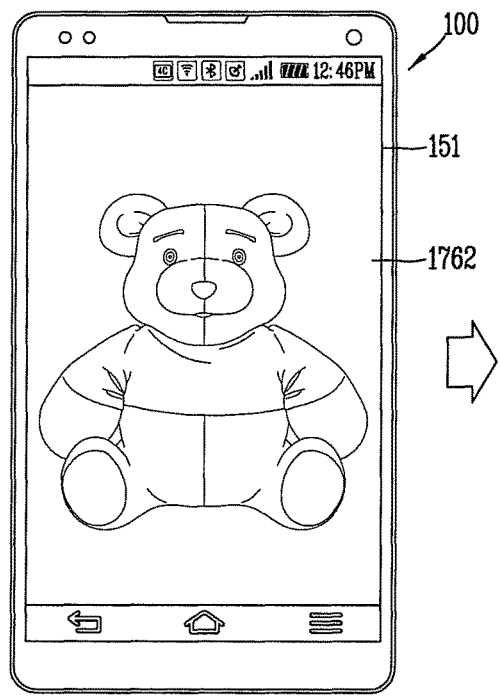
Figure 17C:
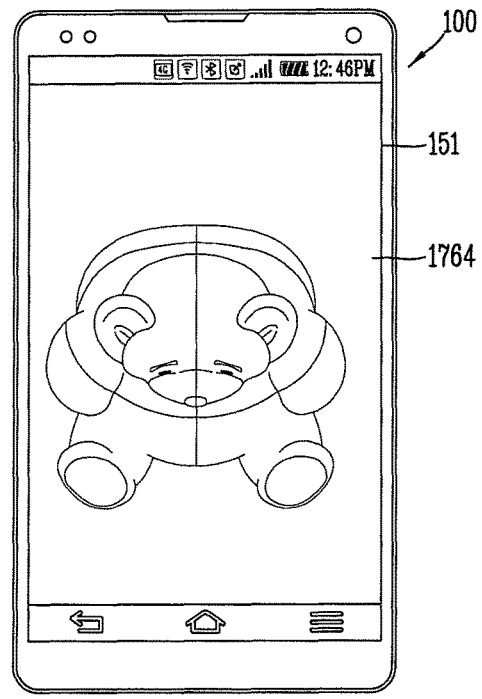
Figure 17C:
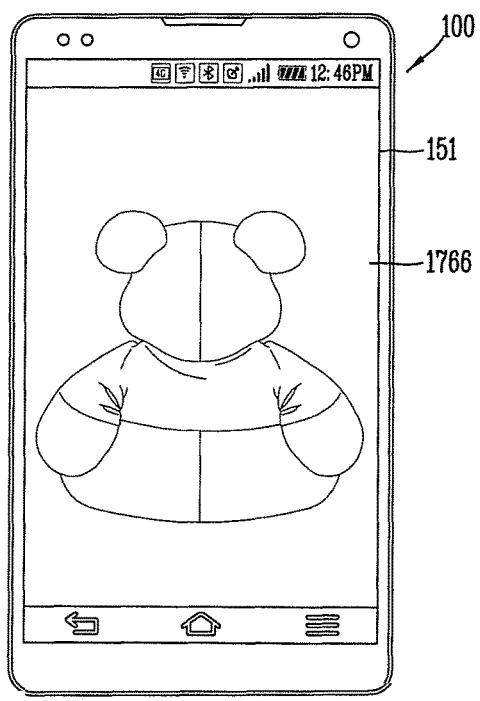

FIGS. 17A to 17C are conceptual views illustrating an example of capturing a plurality of images for a longitudinal face as well as a transverse face of the subject in such a mobile terminal according to an embodiment of the present disclosure.

For example, FIG. 17A illustrates an example of capturing different faces of the subject in such transverse and longitudinal directions. For example, the mobile terminal 100 according to an embodiment of the present disclosure may capture the images of the subject 1700 from different faces 1722, 1726 in a transverse direction as described above. When the mobile terminal 100 according to an embodiment of the present disclosure moves in a transverse direction 1720 to captures the subject 1700 as described above, images of the subject 1700 from different faces in the transverse direction may be captured as illustrated in FIGS. 17B(a), 17B(b) and 17B(c). In this case, the controller 180 may acquire information on a stereoscopic shape of the subject 1700 using the images 1752, 1754, 1756 captured from faces in the transverse direction.

However, the present disclosure may of course use images captured from different faces in a longitudinal direction as well as images captured in such a transverse direction. In other words, when the mobile terminal 100 according to an embodiment of the present disclosure moves in a longitudinal direction 1710 to capture the subject 1700, for example, the images of the subject 1700 from different faces in the longitudinal direction may be captured as illustrated in FIGS. 17C(a), 17C(b) and 17C(c). In this case, the controller 180 may of course acquire information on a stereoscopic shape of the subject 1700 using images 1762, 1764, 1766 captured from faces in the longitudinal direction.

On the other hand, though it has been in the foregoing description of FIGS. 17A through 17C that information on a stereoscopic shape of the subject 1700 is acquired using images captured only in any one of the transverse direction 1720 and longitudinal direction 1710, the mobile terminal 100 according to an embodiment of the present disclosure may of course use all images captured in the transverse direction or longitudinal direction. In this case, the controller 180 may use all the images captured from different faces in the longitudinal direction as well as the transverse direction, and thus of course generate information on a stereoscopic shape associated with the 1700 in a more accurate manner.

The effect of a control command and a control method thereof according to the present disclosure will be described as follows.

According to any one of the embodiments of the present disclosure, the present disclosure may generate information on a stereoscopic shape associated with the subject using a plurality of images captured of different faces of the subject, thereby having an advantage in that a stereoscopic shape of the subject can be directly output through a 3D printer connected thereto.

Furthermore, according to any one of the embodiments of the present disclosure, the present disclosure may generate and display a 3D object corresponding to the subject, thereby having an advantage in that a user can check a stereoscopic shape of the subject corresponding to the generated information in advance.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal.

On the other hand, according to the foregoing description, it has been described that a 3D object corresponding to the subject can be simply displayed on the display unit 151, but the 3D object may be of course displayed in various ways according to the user's selection. For example, the controller 180 may of course display the 3D object on a user's selected image or the generated 3D object may be of course included in a preview image received from the camera 121. In this case, the controller 180 may store an image including the 3D object when storing the preview image according to the user's selection.

Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A mobile terminal, comprising:
a display;
a camera having a plurality of lenses to capture a plurality of images, the plurality of lens arranged in a matrix form; and
a controller to obtain a plurality of three-dimensional (3D) information on different views of an object using a plurality of image groups consisting of the plurality of images, and the controller to provide stereoscopic shape information associated with the object using the plurality of 3D information, wherein the controller displays, on the display, a preview image of the object using a plurality of images received from the camera, and the controller controls the display to display guide information based on at least one of a distance between the object and the camera, and a location of the object displayed on the preview image.

2. The mobile terminal of claim 1, wherein the controller to connect the mobile terminal to a 3D printer, and the controller to transmit, to the 3D printer, the stereoscopic shape information, and the controller to control the 3D printer to output a stereoscopic shape associated with the object.

3. The mobile terminal of claim 1, wherein the controller analyzes a flexion of one view of the object from images captured of the one view of the object, and the controller to determine a scheme of capturing the plurality of images based on a result of the analysis.

4. The mobile terminal of claim 3, wherein the controller separates one view of the object into a plurality of regions according to an extent of flexion of one view of the object as a result of the analysis, and the controller to change the scheme of capturing the plurality of images for each of the separated regions.

5. The mobile terminal of claim 4, wherein the controller to receive a user selection, in advance, of the scheme of capturing the plurality of images for each of the separated regions.

6. The mobile terminal of claim 4, wherein the controller controls the camera such that:
a first group of the plurality of lenses captures a high resolution image for a region, of the plurality of regions, having a higher level than a preset value of the extent of flexion , and
a second group of the plurality of lenses records a video for a region, of the plurality of regions, having a lower level than a preset value of the extent of flexion.

7. The mobile terminal of claim 4, wherein the controller controls the display to display regions having a different extent of flexion in a distinguished manner from one another based on the result of the analysis.

8. The mobile terminal of claim 1, wherein when there are a plurality of objects, the controller groups the plurality of lenses into a plurality of groups according to a total number of objects, and the controller provides a plurality of three-dimensional information on a different object for each group, and the controller provides stereoscopic shape information associated with each of the objects using the three-dimensional information for each group.

9. The mobile terminal of claim 1, wherein a first distance is a distance between the object and the camera as determined based on a previously captured subject object, and a second distance is a distance between the object and the camera as determined based on the preview image, wherein when the second distance is different from the first distance by more than a predetermined amount, the controller controls the display to display the guide information, and
the guide information includes information indicating a difference between the first distance and the second distance.

10. The mobile terminal of claim 1, wherein a first location is a location of the object displayed on a previously captured subject image, and a second location is a location of the object displayed on the preview image, wherein when the second location is different from the first location by more than a predetermined amount, the controller controls the display to display the guide information, and
the guide information includes information on a direction for aligning the second location with a location corresponding to the first location.

11. The mobile terminal of claim 1, wherein when three-dimensional information on a specific view of the object is insufficient in generating information on a stereoscopic shape of the object, the controller controls the display to display notification information for displaying the specific view.

12. The mobile terminal of claim 11, wherein the controller provides three-dimensional information of the specific view by using three-dimensional information of another view of the object, the another view being symmetric to the specific view of the object.

13. The mobile terminal of claim 1, wherein the controller controls the display to display an image containing a 3D object corresponding to the object based on a touch input at the stereoscopic shape at the display.

14. The mobile terminal of claim 13, wherein the controller partitions the display into a plurality of regions, and displays image information associated with a different view of the object in each of the plurality of regions, and
the controller controls the display to display an image associated with a specific view of the 3D object displayed in the selected region when one of the plurality of regions is selected.

15. The mobile terminal of claim 14, wherein the controller selects image information displayed on part of the plurality of regions according to a preset order to sequentially display the regions on the display, and
the preset order is an order in which at least part of the plurality of regions are selected by a user.

16. The mobile terminal of claim 13, wherein the controller controls the display to display an image in which the 3D object is rotated with respect to a preset axis based on a touch drag trajectory at one region of the display.

17. The mobile terminal of claim 13, wherein the controller displays, on the display, an image displayed with a specific view of the 3D object based on at least one of a size of a region in which a touch input is sensed, and a direction in which the sensed location of the region is changed.

18. The mobile terminal of claim 17, wherein the controller controls the display to rotate the 3D object with respect to a preset axis based on a size change of a region in which the touch input is sensed and a direction in which the sensed location of the region is changed.

19. A method of a mobile terminal that includes a camera having with a plurality of lenses to capture a plurality of images, the plurality of lens provided in a matrix form, the method comprising:
obtaining three-dimensional (3D) information on one view of an object from a plurality of image groups captured of the one view of the object;
obtaining a plurality of 3D information based on different views of the object;
providing stereoscopic shape information associated with the object using the plurality of 3D information;
providing the stereoscopic shape information from the mobile terminal to an external device and thereby controlling the external device to output a stereoscopic shape corresponding to the object using the stereoscopic shape information;
displaying, on the display, a preview image of the object using a plurality of images received from the camera; and displaying, on the display, guide information based on at least one of a distance between the object and the camera, and a location of the object displayed on the preview image.

20. The method of claim 19, further comprising analyzing a flexion of one view of the object from images captured of the one view of the object, and determining a scheme of capturing the plurality of images based on a result of the analysis.

21. The method of claim 20, further comprising separating one view of the object into a plurality of regions according to an extent of flexion of the one view of the object as a result of the analysis, and changing the scheme of capturing the plurality of images for each of the separated regions.

22. The method of claim 21, further comprising displaying regions having a different extent of flexion in a distinguished manner from one another based on the result of the analysis.

23. The method of claim 19, further comprising displaying an image containing a 3D object corresponding to the object based on a touch input at the stereoscopic shape at the display.

24. The method of claim 23, further comprising:

partitioning the display into a plurality of regions, displaying image information associated with a different view of the object in each of the plurality of regions, and displaying an image associated with a specific view of the 3D object displayed in the selected region when one of the plurality of regions is selected.

25. The method of claim 23, further comprising displaying an image in which the 3D object is rotated with respect to a preset axis based on a touch drag trajectory at one region of the display.

* * * * *